United States Patent
Nakamura et al.

(10) Patent No.: US 11,266,904 B2
(45) Date of Patent: Mar. 8, 2022

(54) GAME SYSTEM, GAME CONTROL DEVICE, AND INFORMATION STORAGE MEDIUM

(71) Applicant: KONAMI DIGITAL ENTERTAINMENT CO., LTD., Tokyo (JP)

(72) Inventors: Masaki Nakamura, Tokyo (JP); Yugo Kishino, Tokyo (JP); Yuji Fujishiro, Tokyo (JP); Kenta Ogawa, Tokyo (JP); Hideki Yanagihara, Tokyo (JP); Kei Masuda, Tokyo (JP); Junichi Taya, Tokyo (JP); Hideto Nishiyama, Tokyo (JP); Taku Hamasaki, Osaka (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 13 days.

(21) Appl. No.: 16/584,896

(22) Filed: Sep. 26, 2019

(65) Prior Publication Data

US 2020/0038746 A1  Feb. 6, 2020

Related U.S. Application Data

(63) Continuation of application No. PCT/JP2018/010280, filed on Mar. 15, 2018.

(30) Foreign Application Priority Data

Mar. 27, 2017  (JP) .............................. JP2017-061954

(51) Int. Cl.
*A63F 13/24* (2014.01)
*A63F 13/2145* (2014.01)
(Continued)

(52) U.S. Cl.
CPC .......... *A63F 13/2145* (2014.09); *A63F 13/23* (2014.09); *G06F 3/04845* (2013.01);
(Continued)

(58) Field of Classification Search
None
See application file for complete search history.

(56) References Cited

U.S. PATENT DOCUMENTS

2011/0172013 A1* 7/2011 Shirasaka ............... A63F 13/92
463/37
2011/0285636 A1* 11/2011 Howard .............. G06F 3/04815
345/173

(Continued)

FOREIGN PATENT DOCUMENTS

JP  3734819 B1  1/2006
JP  2014203417 A  10/2014
(Continued)

OTHER PUBLICATIONS

Office Action dated Dec. 17, 2019, for corresponding JP Patent Application No. 2018-230601.
(Continued)

*Primary Examiner* — Dmitry Suhol
*Assistant Examiner* — Alex F. R. P. Rada, II
(74) *Attorney, Agent, or Firm* — HEA Law PLLC

(57) ABSTRACT

At least one memory device of a game system stores a plurality of instructions, which, when executed by at least one processor, cause the at least one processor to: set, on a touch panel, a reception area for receiving a direction designation operation; move, in accordance with a movement of a touch position on the touch panel, an operation position in a direction corresponding to a moving direction of the touch position by a distance longer than a moving distance of the touch position; acquire a designated direction (Continued)

based on a direction from a reference position corresponding to the reception area to the operation position; and execute game processing based on the designated direction.

10 Claims, 27 Drawing Sheets

(51) Int. Cl.
    *A63F 13/23*     (2014.01)
    *G06F 3/04845*     (2022.01)
    *G06F 3/04886*     (2022.01)

(52) U.S. Cl.
    CPC .. *G06F 3/04886* (2013.01); *A63F 2300/1025* (2013.01); *A63F 2300/1075* (2013.01)

(56) References Cited

U.S. PATENT DOCUMENTS

| | | | | |
|---|---|---|---|---|
| 2012/0169610 | A1* | 7/2012 | Berkes | G06F 3/0414 345/173 |
| 2014/0364214 | A1* | 12/2014 | Ayoub | A63F 13/06 463/31 |
| 2015/0182856 | A1* | 7/2015 | Mays, III | A63F 13/26 463/31 |
| 2015/0378459 | A1* | 12/2015 | Sawada | G06F 3/0488 345/173 |
| 2016/0041717 | A1* | 2/2016 | Hammontree | A63F 13/533 463/38 |

FOREIGN PATENT DOCUMENTS

| | | |
|---|---|---|
| JP | 2016-009473 A | 1/2016 |
| WO | 2013/018480 A1 | 2/2013 |

OTHER PUBLICATIONS

International Search Report for PCT/JP2018/010279 dated Jun. 12, 2018 with its translation. (Concise explanation of relevance for foreign patent document 1.).
International Search Report for PCT/JP2018/010280 dated May 29, 2018 with its translation. (Concise explanation of relevance for foreign patent documents 1 and 3.).
Form PCT/ISA/237 with PCT/IB/338 and PCT/IB/373 of PCT/JP2018/010279. (Concise explanation of relevance for foreign patent document 1.).
Form PCT/ISA/237 with PCT/IB/338 and PCT/IB/373 of PCT/JP2018/010280. (Concise explanation of relevance for foreign patent documents 1 and 3.).
Office Action of Aug. 22, 2017, for relating JP Application No. 2017-061953, with translation. (Concise explanation of relevance for foreign patent documents 1 and 2.).
Office Action of Jan. 16, 2018, for relating JP Application No. 2017-061953, with translation. (Concise explanation of relevance for foreign patent documents 1 and 2.).
Office Action of May 22, 2018, for corresponding JP Application No. 2017-061954, with translation. (Concise explanation of relevance for foreign patent documents 1 and 3.).

* cited by examiner

GAME SYSTEM, GAME CONTROL DEVICE, AND INFORMATION STORAGE MEDIUM

CROSS-REFERENCE TO RELATED APPLICATION

This application is a continuation application of International Application PCT/JP2018/010280 filed on Mar. 15, 2018, which claims priority from Japanese application JP 2017-061954 filed on Mar. 27, 2017, the content of these applications are incorporated herein by reference in their entirety.

BACKGROUND OF THE INVENTION

1. Field of the Invention

The present invention relates to a game system, a game control device, and an information storage medium.

2. Description of the Related Art

A gamepad of a stationary game machine and a portable game machine is provided with an operation member (e.g., direction button or direction lever) to be used for performing a direction designation operation. In contrast, a smartphone, a tablet computer, and other such devices are often provided with a touch panel instead of being provided with such an operation member. On such a device, a virtual operation member (e.g., virtual direction button or virtual direction lever) to be used for performing a direction designation operation is displayed, to thereby allow a user to perform the direction designation operation through the touch panel. For example, when the user touches a position of the virtual operation member in a display area, a direction from the center point of the display area to the touch position is determined as a direction (designated direction) designated by the user (JP 2016-009473 A).

SUMMARY OF THE INVENTION

A real operation member provided to a gamepad of a stationary game machine allows a user to have the feeling of operating the operation member, while such a virtual operation member as described above does not allow the user to have the feeling of operating the operation member. This may cause a deviation between an operation intended by the user and an operation being actually performed by the user.

For example, in a case of designating a left direction after designating a right direction, the user first moves a touch position from the center point to the right side in a display area of the virtual operation member, to thereby designate the right direction. After that, in order to designate the left direction, the user is required to move the touch position from the right side to the left side relative to the center point in the display area. However, in such a case, a moving distance of the touch position of the user tends to be short, and may be not enough to cause the touch position to move to the left side relative to the center point of the display area, thereby leaving the touch position on the right side relative to the center point. In this case, although the user intends to have designated the left direction, a game system determines that the right direction has been designated, which raises a fear that the user may feel poor operability.

The present invention has been made in view of the above-mentioned problem, and has an object to provide a game system, a game control device, and a program that are capable of reducing an occurrence of a difference between a designated direction intended by a user who has performed a direction designation operation through a touch panel and a designated direction determined by the game system.

In order to solve the above-mentioned problem, according to at least one aspect of the present invention, there is provided a game system including: at least one processor; and at least one memory device configured to store a plurality of instructions, which, when executed by the at least one processor, cause the at least one processor to: set, on a touch panel, a reception area for receiving a direction designation operation; move, in accordance with a movement of a touch position on the touch panel, an operation position in a direction corresponding to a moving direction of the touch position by a distance longer than a moving distance of the touch position; acquire a designated direction based on a direction from a reference position corresponding to the reception area to the operation position; and execute game processing based on the designated direction.

Further, according to at least one aspect of the present invention, there is provided a game control device including: at least one processor; and at least one memory device configured to store a plurality of instructions, which, when executed by the at least one processor, cause the at least one processor to: set, on a touch panel, a reception area for receiving a direction designation operation; move, in accordance with a movement of a touch position on the touch panel, an operation position in a direction corresponding to a moving direction of the touch position by a distance longer than a moving distance of the touch position; and acquire a designated direction based on a direction from a reference position corresponding to the reception area to the operation position.

DETAILED DESCRIPTION OF THE INVENTION

Now, an example of at least one embodiment of the present invention is described with reference to the accompanying drawings.

Figure 1:
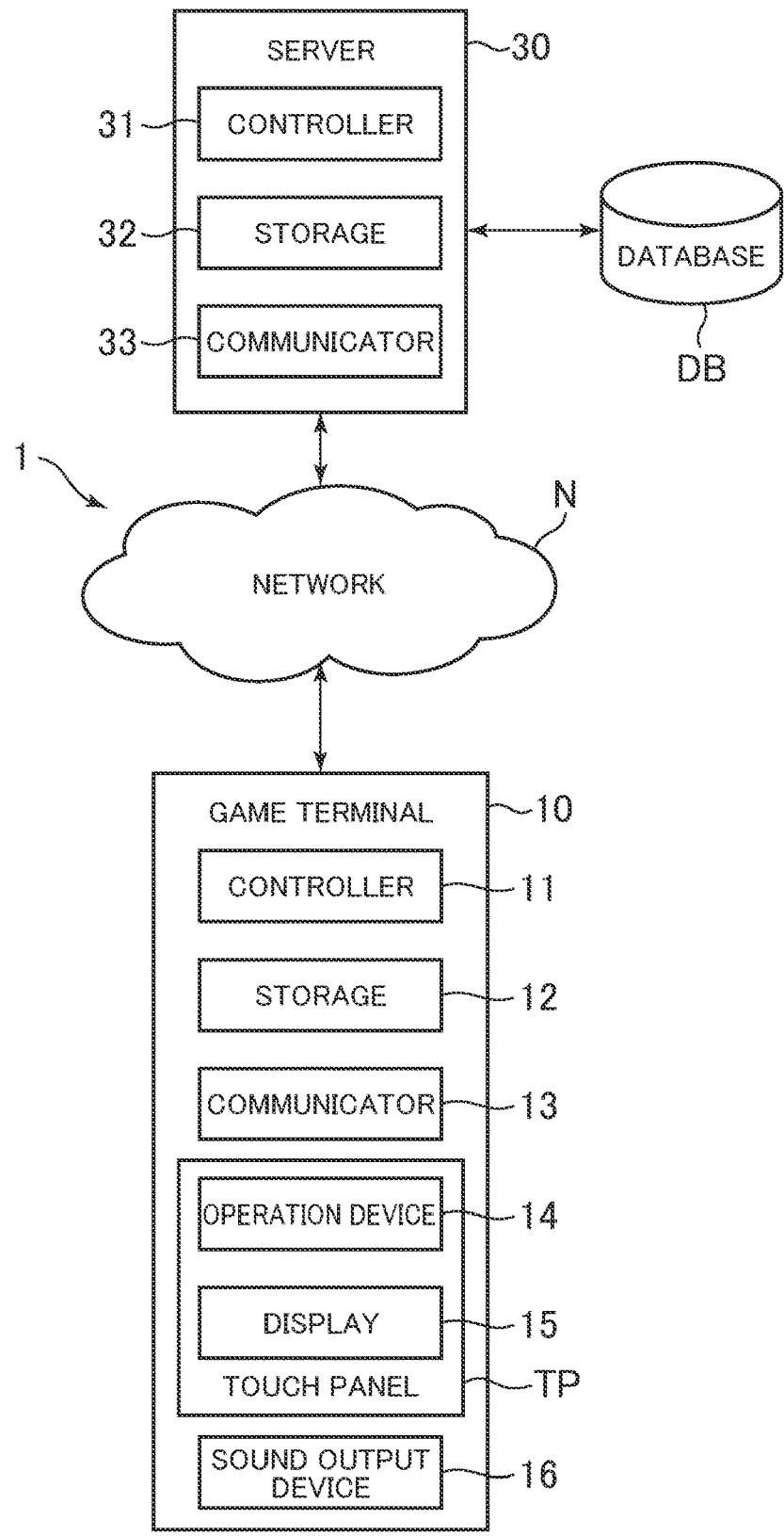
FIG. 1 is a diagram for illustrating an overall configuration of a game system according to at least one embodiment of the present invention.

[1. Configuration of Game System] FIG. 1 is a diagram for illustrating a configuration of a game system according to the at least one embodiment of the present invention. As illustrated in FIG. 1, a game system 1 according to at least one embodiment includes a game terminal 10 and a server 30. The game terminal 10 and the server 30 are capable of communicating data to/from each other through a network N.

The game terminal 10 is a computer to be used by a user to play a game. The game terminal 10 is, for example, a cell phone (including a smartphone) or a portable information terminal (including a tablet computer).

As illustrated in FIG. 1, the game terminal 10 includes a controller 11, a storage 12, a communicator 13, an operation device 14, a display 15, and a sound output device 16. The controller 11 includes at least one microprocessor, and executes information processing in accordance with a program stored in the storage 12. The storage 12 includes a main storage (for example, RAM) and an auxiliary storage (for example, nonvolatile semiconductor memory, hard disk drive, or solid-state drive), and stores the program or data. The communicator 13 communicates data to/from another device through the network N.

The operation device 14 is configured to allow the user to perform various operations. The display 15 is configured to display various images, and is, for example, a liquid crystal display or an organic EL display. The sound output device 16 is configured to output sound data, and is, for example, a speaker or headphones. As illustrated in FIG. 1, the operation device 14 and the display 15 are integrally formed as a touch panel TP. The touch panel TP is capable of detecting a position at which the touch panel TP is touched by a user's body part (for example, finger) or an object (for example, touch pen). Various types of touch panels can be employed as the touch panel TP. The "touch" refers to touching the touch panel TP by the user's body part or the object.

The server 30 is, for example, a server computer. As illustrated in FIG. 1, the server 30 includes a controller 31, a storage 32, and a communicator 33. The controller 31, the storage 32, and the communicator 33 are the same as the controller 11, the storage 12, and the communicator 13, respectively, of the game terminal 10. The server 30 is capable of accessing a database DB. The database DB may be built in the server 30, or may be built in a server computer separate from the server 30.

A program and data are supplied to the game terminal 10 or the server 30 through the network N to be stored in the storage 12 or the storage 32, respectively. The game terminal 10 or the server 30 may include a component (for example, optical disc drive or memory card slot) to be used for reading the program and the data stored in an information storage medium (for example, optical disc or memory card). Then, the program and the data may be supplied to the game terminal 10 or the server 30 through the information storage medium.

[2. Outline of Game] In the game system 1, it is possible to execute various games including a sport game, an action game, and a role-playing game.

In the game executed in the game system 1, the user performs an operation by touching the touch panel TP. For example, in the game, an operation target of the user acts in accordance with the operation performed by touching the touch panel TP. In this case, the "operation target" refers to an object to be operated by the user. In other words, the "operation target" refers to an object configured to act and change its state in accordance with the user's operation. The "object" is displayed on the display 15, and can be a target to be operated by the user. For example, a game character or vehicle configured to operate in accordance with the user's operation or a cursor configured to move in accordance with the user's operation corresponds to an example of the "object".

In the following description, as an example of the game to be executed in the game system 1, there is described a soccer game configured so that a plurality of game characters belonging to a user team operated by the user and a plurality of game characters belonging to an opponent team operated by an opponent play a soccer match in a virtual world.

In this case, the "virtual world" refers to a world in the game. The "virtual world" may be a three-dimensional space or a two-dimensional plane. The "virtual world" can be rephrased as "virtual space" or "game space". The "opponent" may be a computer (CPU), or may be another user.

The game may be a standalone game to be executed by the game terminal 10 alone, or may be a client-server game to be executed through data communication between the game terminal 10 and the server 30. The following description is basically given based on the premise that a soccer game is executed in a standalone format.

Figure 2:
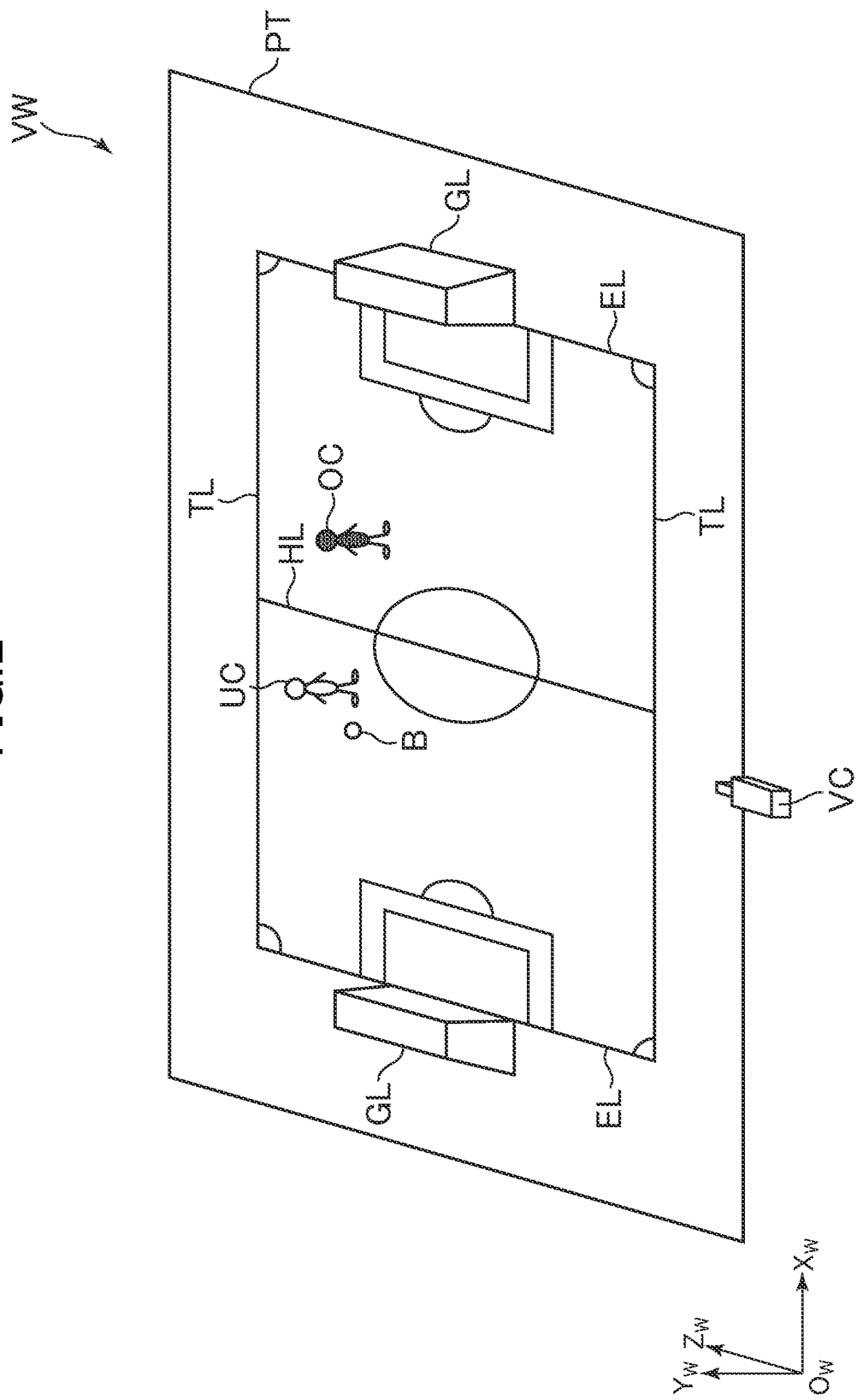
FIG. 2 is a diagram for illustrating an example of a virtual world.

FIG. 2 is a diagram for illustrating an example of the virtual world. As illustrated in FIG. 2, a virtual world VW represents, for example, a virtual soccer field in a three-dimensional space. In the virtual world VW, a predetermined position is set as an origin Ow, and an Xw-axis, a Yw-axis, and a Zw-axis (coordinate axes in a world coordinate system) perpendicular to one another are set. A position in the virtual world VW is identified by coordinate values in the world coordinate system.

As illustrated in FIG. 2, in the virtual world VW, a pitch PT being a 3D model of a pitch is arranged in parallel to an Xw-Zw plane. In the pitch PT, for example, touch lines TL, goal lines EL, and a halfway line HL are drawn. In addition, a user character UC, an opponent character OC, a ball B being a 3D model of a ball, and goals GL each being a 3D model of a goal are arranged on the pitch PT. The user character UC is a game character belonging to the user team, and the opponent character OC is a game character belonging to the opponent team.

In the virtual world VW, a virtual viewpoint VC is set. The virtual viewpoint VC is a viewpoint set in the virtual world VW, and is, for example, a virtual camera. A position and a line-of-sight direction of the virtual viewpoint VC are controlled so that, for example, at least one of the user character UC to be operated by the user or the ball B is included in a visual field of the virtual viewpoint VC. The position and the line-of-sight direction of the virtual viewpoint VC may be fixed. When a match is started, a virtual world image indicating how the virtual world VW is viewed from the virtual viewpoint VC is displayed on the display 15.

Figure 3:
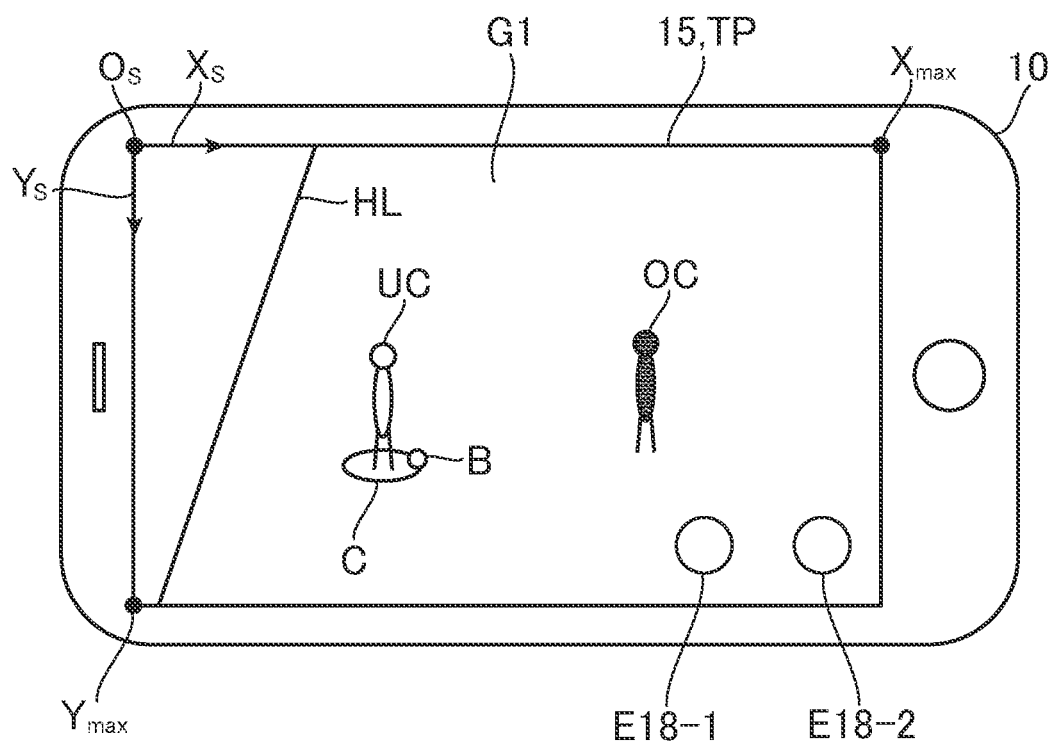
FIG. 3 is a diagram for illustrating an example of a virtual world image.

FIG. 3 is a diagram for illustrating an example of an image to be displayed on the display 15 during the match in the soccer game. As illustrated in FIG. 3, a virtual world image G1 is displayed on the display 15. The virtual world image G1 is displayed by converting coordinates indicating how the virtual world VW appears in the visual field of the virtual viewpoint VC. In addition, as illustrated in FIG. 3, images of a virtual first button E18-1 and a virtual second button E18-2 are displayed at predetermined positions in the virtual world image G1. The first button E18-1 and the second button E18-2 are described later.

In a display area of the display 15, a predetermined position (for example, upper left of the display area) is set as an origin $O_s$, and an $X_s$-axis and a $Y_s$-axis (coordinate axes in a screen coordinate system) perpendicular to each other are set. The display area is, for example, an entire screen of the display 15. A position in the display area is identified by coordinate values in the screen coordinate system. For example, an $X_s$ coordinate value of the right edge of the display area is referred to as "$X_{max}$", and a $Y_s$ coordinate value of the lower edge of the display area is referred to as "$Y_{max}$". At least one embodiment is described by taking a case in which the game is played with its horizontal width being longer than its vertical width (with the game terminal 10 being held horizontally). In contrast, the game may be played with its vertical width being longer than its horizontal width (with the game terminal 10 being held vertically). In at least one embodiment, a touch position detected by the touch panel TP is also indicated by the coordinate values in the screen coordinate system, but may be indicated by coordinate values in other coordinate axes.

The user plays the soccer game while watching the virtual world image G1. In the soccer game, any one of a plurality of user characters UC belonging to the user team is set as the operation target of the user. At the feet of the operation target user character UC, a cursor C for identifying that the user character UC is set as the operation target is displayed. The operation target user character UC operates in accordance with the user's operation. For example, the operation target user character UC is moved in a direction designated by the user through a direction designation operation, and performs an action (for example, passing, shooting, or sliding tackle) designated by the user through an action designation operation. A user character UC other than the operation target autonomously acts in accordance with, for example, a predetermined algorithm.

The operation target may be switched among the plurality of user characters UC during the game, or may be fixed to a specific user character UC. In a mode in which the operation target is switched, for example, the user character UC holding the ball B at a time of attack is set as the operation target, and the user character UC closest to the opponent character OC holding the ball B is set as the operation target at a time of defense. The "time of attack" refers to, for example, a state in which the user team is holding the ball B. Meanwhile, the "time of defense" refers to, for example, a state in which the opponent team is holding the ball B. A state in which the ball B is not being held by any one of the teams may be classified into the time of attack, or may be classified into the time of defense.

Various operations on the operation target user character UC are performed through the touch panel TP. In this respect, in at least one embodiment, an area of the touch panel TP is divided into a plurality of operation areas. A separate operation scheme is defined for each operation area, and the user performs an operation corresponding to a touched operation area.

Figure 4:
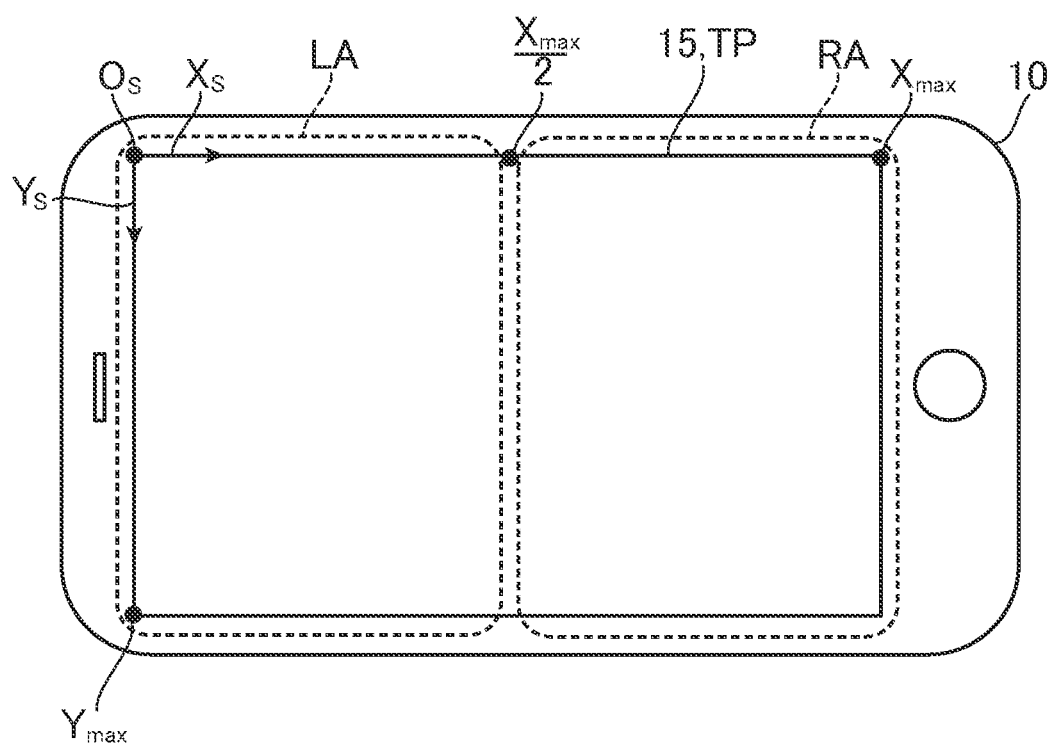
FIG. 4 is a diagram for illustrating an example of a plurality of areas set for a touch panel.

FIG. 4 is a diagram for illustrating an example of a plurality of areas set for the touch panel TP. In the example of FIG. 4, a left-side area LA and a right-side area RA are set on the touch panel TP relative to the center of the touch panel TP. For example, the left-side area LA is an area having the $X_s$ coordinate smaller than $X_{max}/2$, and the right-side area RA is an area having the $X_s$ coordinate equal to or larger than $X_{max}/2$. For example, the left-side area LA is mainly used for performing a movement designation operation on the user character UC. Meanwhile, the right-side area RA is mainly used for performing an operation other than a movement designation operation on the user character UC. The first button E18-1 and the second button E18-2, which are described above, are displayed in the right-side area RA to be used for performing an operation other than a movement designation operation on the user character UC.

In FIG. 4, the center of the touch panel TP is set as a boundary in the operation area, but the boundary in the operation area may be set at any position. In addition, two areas of the left-side area LA and the right-side area RA are set in FIG. 4, but the number of operation areas to be set on the touch panel TP is not limited to two, and may be equal to or larger than three.

Figure 5:
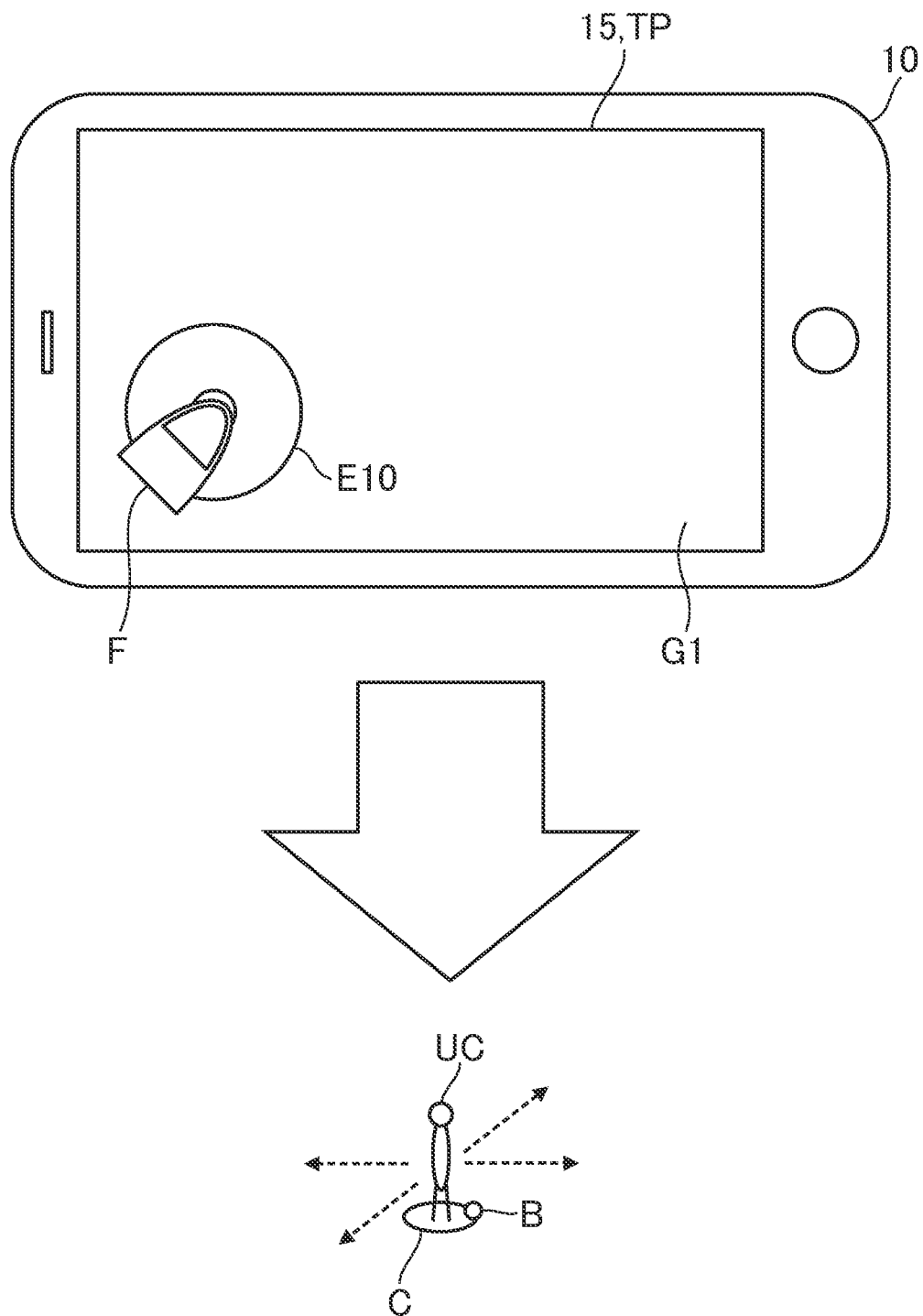
FIG. 5 is a diagram for illustrating a movement designation operation.

Now, a description is given of an example of a specific operation to be performed by the user in the soccer game. First, a movement designation operation for moving the operation target user character UC is described. FIG. 5 is a diagram for illustrating the movement designation operation. In an actual case, for example, the user character UC and the opponent character OC located in the visual field of the virtual viewpoint VC, the first button E18-1, and the second button E18-2 are displayed on the display 15, but are omitted in FIG. 5 for the sake of simplicity of description.

In order to perform the movement designation operation, as illustrated in FIG. 5, the user touches the left-side area LA of the touch panel TP. When the user starts to touch the left-side area LA by a finger F or other such body part, an image of a virtual directional pad E10 (direction button) is displayed in the left-side area LA. The directional pad E10 is configured to receive a direction designation operation, and is used by the user to designate (input) a direction. Even when the user starts to touch the right-side area RA, the directional pad E10 is not displayed in the right-side area RA.

Figure 6:
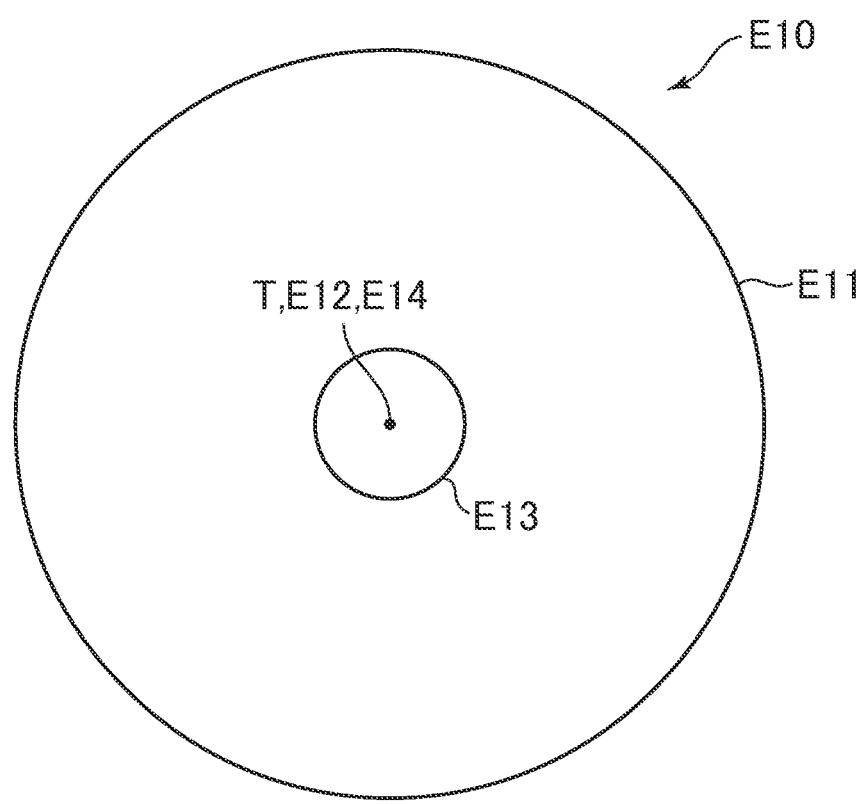
FIG. 6 is a diagram for illustrating a directional pad.

FIG. 6 is a diagram for illustrating the directional pad E10, and is an illustration of the directional pad E10 displayed when a touch in the left-side area LA is started. As illustrated in FIG. 6, the directional pad E10 includes a base portion E11 and a pointer portion E13. The base portion E11 is equivalent to a main body of the directional pad E10, and in the example of FIG. 6, has a circular shape with a center point E12 being used as its center. The pointer portion E13 indicates a touch position T of the user, and in the example of FIG. 6, has a circular shape with a center point E14 being used as its center. In the example illustrated in FIG. 6, the base portion E11 and the pointer portion E13 both have a circular shape, but are not required to have a circular shape, and may have shapes different from each other.

At a touch start time point, the display position of the directional pad E10 is set based on the touch position T of the user. Specifically, the directional pad E10 is arranged so that the center point E12 of the base portion E11 agrees with the touch position T of the user. The pointer portion E13 is also arranged so that the center point E14 of the pointer portion E13 agrees with the touch position T of the user. The center point E12 of the base portion E11 is equivalent to the center point of the entire directional pad E10, and hence in the following description, the center point E12 may be described as the center point of the directional pad E10.

When the user moves the touch position T by performing a slide operation, the pointer portion E13 is moved in accordance with the movement of the touch position T. The "slide operation" refers to an operation in which the user moves the finger F or other such body part while keeping the finger F or other such body part touching the touch panel TP and maintains the touch even after the movement.

In at least one embodiment, two modes of a normal mode and a sensitive mode are provided as operation modes of the directional pad E10. A manner in which the pointer portion E13 is moved differs between the normal mode and the sensitive mode, details of which are described later. When the soccer game is played for the first time or when the user performs a specific operation, an operation mode selection image for receiving a selection of any one of the normal mode and the sensitive mode is displayed on the display 15. The user can select any one of the normal mode and the sensitive mode by operating the operation mode selection image.

Figure 7:
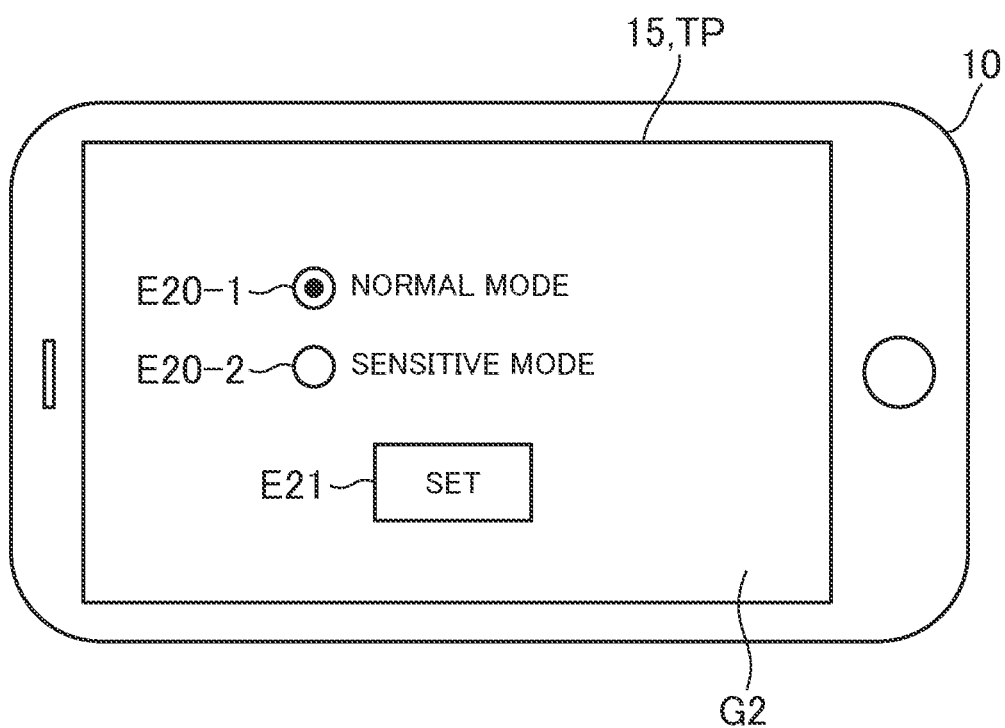
FIG. 7 is an illustration of an example of an operation mode selection image.

FIG. 7 is an illustration of an example of the operation mode selection image. As illustrated in FIG. 7, an operation mode selection image G2 includes an option button E20-1 being a display element for selecting the normal mode, an option button E20-2 being a display element for selecting the sensitive mode, and a set button E21 being a display element for determining the selection of the operation mode. When a tap operation is performed on the option button E20-1, the normal mode is selected. In the same manner, when a tap operation is performed on the option button E20-2, the sensitive mode is selected. In addition, when a tap operation is performed on the set button E21, the operation mode is set to a selected mode. Therefore, when the user performs a tap operation on the set button E21 after selecting any one of the normal mode and the sensitive mode by performing a tap operation on any one of the option buttons E20-1 and E20-2, the operation mode is set to the selected mode. The "tap operation" refers to an operation of tapping the touch panel TP once. Data indicating a result of the user's selection is stored in the storage 12 (or storage 32 or database DB), and is referred to when the game is played.

First, a description is given of the normal mode. In the normal mode, the pointer portion E13 is moved at the same moving speed in the same moving direction as those of the touch position T. That is, the pointer portion E13 is moved in the same direction as a moving direction of the touch position T by the same distance as a moving distance of the touch position T. Therefore, the center point E14 of the pointer portion E13 agrees with the touch position T at all times.

Figure 8:
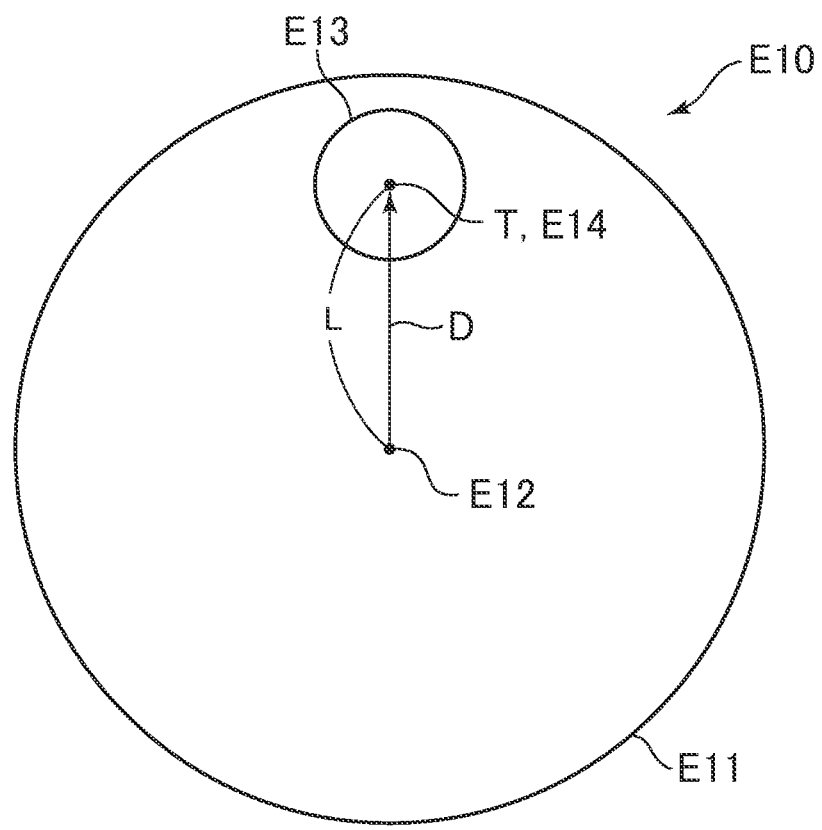
FIG. 8 is a diagram for illustrating a case in which a user has moved a touch position during a normal mode.

FIG. 8 is an illustration of a case in which the user has moved the touch position T during the normal mode. In FIG. 8, the user has moved the touch position T upward relative to the center point E12 of the base portion E11. At this time, the center point E14 of the pointer portion E13 has been also moved upward relative to the center point E12.

In the directional pad E10, a direction D from the center point E12 to the center point E14 of the pointer portion E13 (namely, touch position T) is determined as a direction (designated direction) designated by the user. Therefore, for example, as illustrated in FIG. 8, the user can designate an up direction by moving the touch position T to a position on an upper side relative to the center point E12. In addition, for example, the user can designate a right direction by moving the touch position T to a position on a right side relative to the center point E12.

The directions that can be designated by the user are not limited to the four directions of up, down, left, and right. For example, the user can specify any directions for 360 degrees about the center point E12. However, the directions that can be designated by the user may be limited to a finite number of directions, for example, four directions or eight directions (up, down, left, right, upper left, upper right, lower left, and lower right). For example, when the directions that can be designated by the user are limited to eight directions, a direction closest to the above-mentioned direction D among the eight directions may be determined as the designated direction.

The operation target user character UC is moved in a direction in the virtual world VW corresponding to the designated direction of the user. Each direction in the directional pad E10 is associated with each direction in the virtual world VW. For example, the up direction, a down direction, the right direction, and a left direction in the directional pad E10 are associated with a positive Zw-axis direction, a negative Zw-axis direction, a positive Xw-axis direction, and a negative Xw-axis direction in the virtual world VW, respectively. Therefore, when the user designates the up direction in the directional pad E10, the operation target user character UC performs a moving action (dribbling action when the user is holding the ball B) toward the positive Zw-axis direction. In this manner, the user can designate the moving direction of the operation target user character UC by adjusting a relative position of the touch position T relative to the center point E12.

The moving speed of the operation target user character UC is set based on a distance L between the center point E12 of the directional pad E10 and the center point E14 of the pointer portion E13 (namely, touch position T). For example, correspondence relationship information indicating a correspondence relationship between the distance L and the moving speed is set, and the moving speed of the operation target user character UC is set based on the correspondence relationship information and the distance L. The correspondence relationship information is set so that, for example, the moving speed becomes higher as the distance L becomes longer. Therefore, by adjusting a distance between the center point E12 and the touch position T, the user can designate the moving speed as well as the moving direction of the operation target user character UC.

In at least one embodiment, the directional pad E10 is moved when the touch position T is moved outward from within the directional pad E10. That is, the touch position T is located in the directional pad E10 at all times.

Figure 9A:
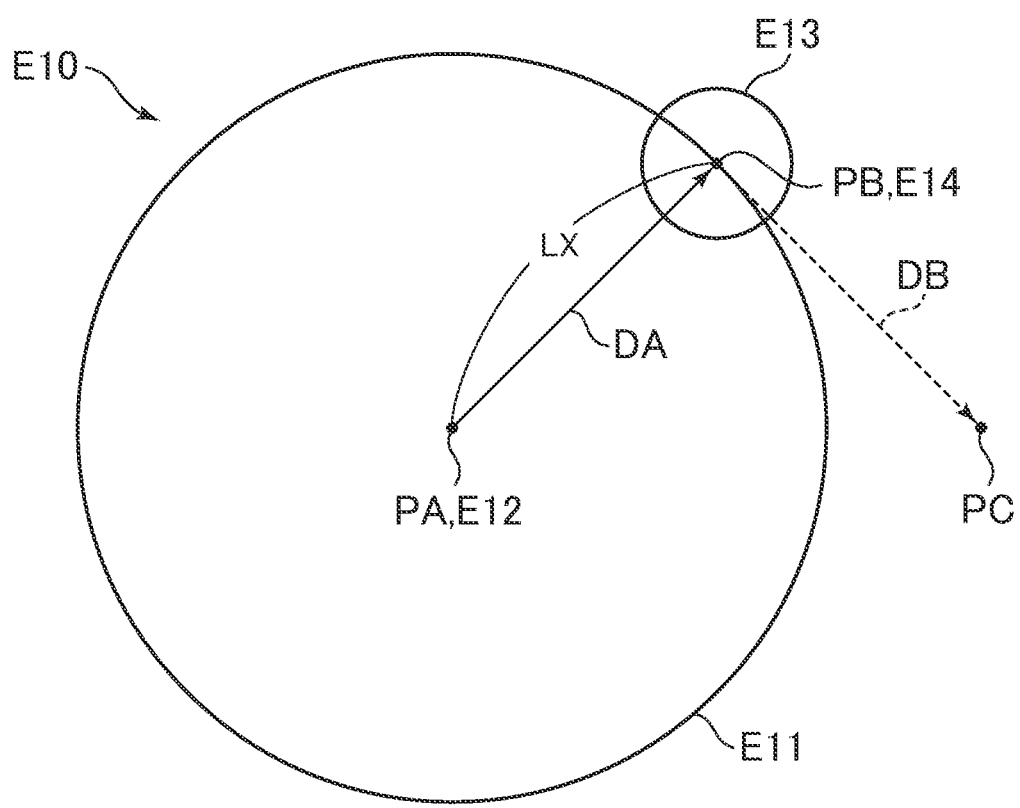
FIG. 9A is a diagram for illustrating a movement of the directional pad during the normal mode.
Figure 9B:
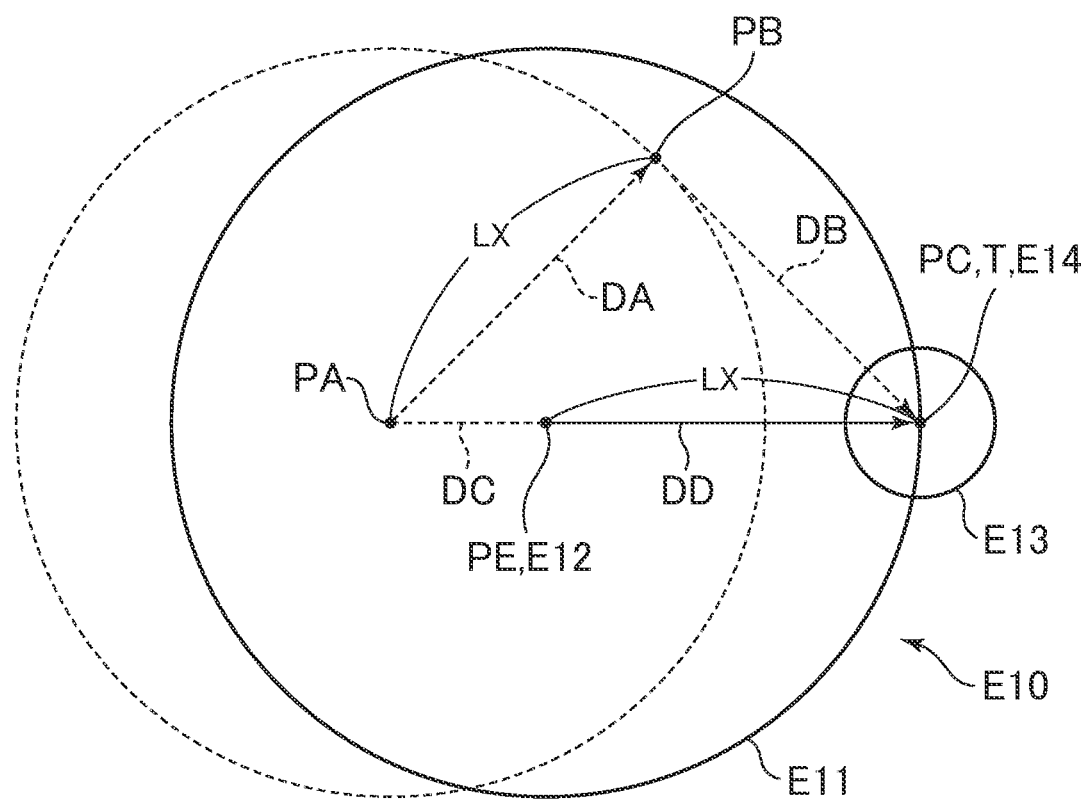
FIG. 9B is a diagram for illustrating a movement of the directional pad during the normal mode.

FIG. 9A and FIG. 9B are diagrams for illustrating the movement of the directional pad E10. In a state illustrated in FIG. 9A, the center point E12 of the directional pad E10 is located at a position PA. In addition, the touch position T and the center point E14 of the pointer portion E13 are located at a position PB (position on the upper right side relative to the center point E12). In this case, a direction DA (upper right direction) from the center point E12 to the center point E14 is acquired as the designated direction. At this time, the operation target user character UC is moved at a moving speed corresponding to a distance LX between the center points E12 and E14 in a moving direction corresponding to the direction DA.

Next, a description is given of a case in which the user has moved the touch position T from the above-mentioned state to a position PC (position on the right side relative to the center point E12) outside the directional pad E10 in order to change the designated direction from the upper right direction (direction DA) to the right direction.

As illustrated in FIG. 9B, when the touch position T is moved to the position PC, in at least one embodiment, a direction DC from the position PA (the position of the center point E12 before the movement of the touch position T in FIG. 9A) to the position PC (a movement destination position of the touch position T) is determined as the moving direction of the directional pad E10. The direction DC represents a direction obtained by combining the direction DA from the position PA to the position PB (namely, designated direction before the movement of the touch position T in FIG. 9A) and a direction DB from the position PB to the position PC (namely, moving direction of the touch position T). In short, the direction DC is a direction indicated by a resultant vector of a vector from the position PA to the position PB and a vector from the position PB to the position PC.

Then, a position PE is determined as the movement destination position of the directional pad E10. The position PE is on a straight line extending from the position PA in the direction DC, and is spaced apart from the position PC by the distance LX between the position PA and the position PB. After the movement destination position is determined, the directional pad E10 is translated in the direction DC so that the center point E12 agrees with the position PE. In this case, the "translating" refers to moving all points in the directional pad E10 in a predetermined direction by a predetermined distance.

When the directional pad E10 is moved in the above-mentioned manner, a direction DD (right direction) from the position PE (center point E12 of the directional pad E10) to the position PC (center point E14 of the pointer portion E13) is acquired as the designated direction. As described above, while the user is moving the touch position T to the position PC with the intention of changing the designated direction to the right direction, the designated direction (right direction) intended by the user is acquired by a game system. In at least one embodiment, the moving direction (direction DC) of the directional pad E10 is determined in consideration of both the designated direction (direction DA in FIG. 9A and FIG. 9B) before the movement of the touch position T and the moving direction of the touch position T (direction DB in FIG. 9A and FIG. 9B), and hence the designated direction intended by the user is acquired by the game system after the movement of the directional pad E10. Therefore, the operation target user character UC is moved in a direction intended by the user.

The distance between the center point E12 and the center point E14 (touch position T) is the same distance (LX) before the movement of the touch position T in FIG. 9A and after the movement of the touch position T in FIG. 9B, and hence the operation target user character UC is moved at the same moving speed even after the movement of the directional pad E10.

Figure 10:
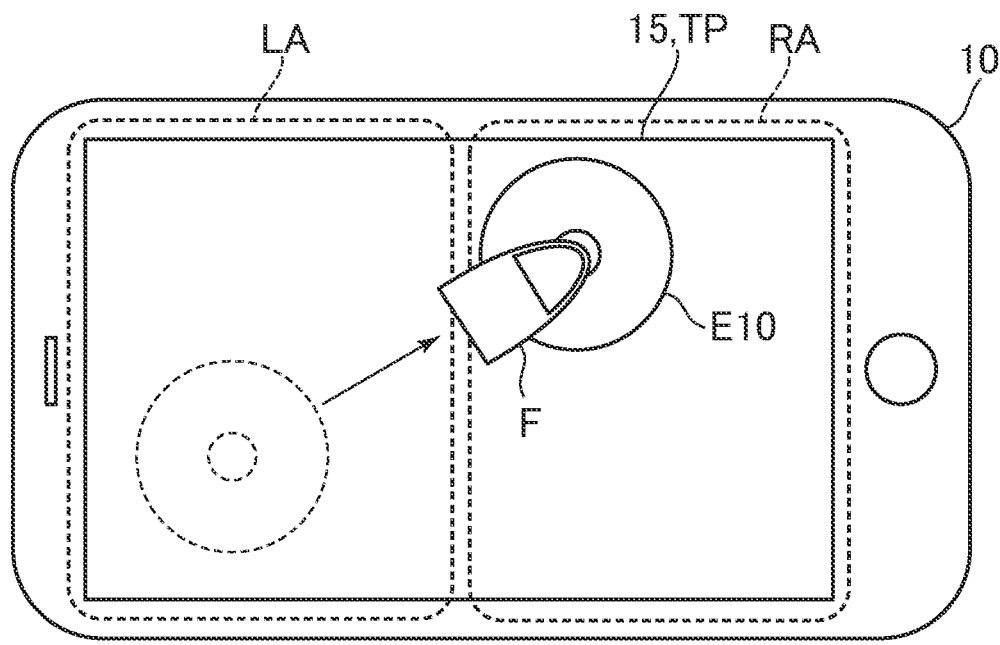
FIG. 10 is a diagram for illustrating a movement of the directional pad into a right-side area.

When the above-mentioned movement of the directional pad E10 is executed once or a plurality of times, the directional pad E10 may be moved into the right-side area RA. As described above, the right-side area RA is an area for performing an operation other than the movement designation operation on the user character UC, and hence even when the user starts to touch the right-side area RA, the directional pad E10 is not displayed in the right-side area RA. However, as illustrated in FIG. 10, when the touch position of the user is moved into the right-side area RA after the directional pad E10 is displayed in the left-side area LA, the directional pad E10 is also moved into the right-side area RA. Therefore, even when the touch position has entered the right-side area RA while the user is performing a direction designation operation through the directional pad E10, the user can continue the direction designation operation.

Next, the sensitive mode is described. The sensitive mode is the same as the normal mode in that the pointer portion E13 is moved in the same moving direction as that of the touch position T, but is different from the normal mode in that the pointer portion E13 is moved at a moving speed higher than that of the touch position T. That is, in the sensitive mode, the pointer portion E13 is moved in the same direction as the moving direction of the touch position T by a distance longer than the moving distance of the touch position T.

Figure 11:
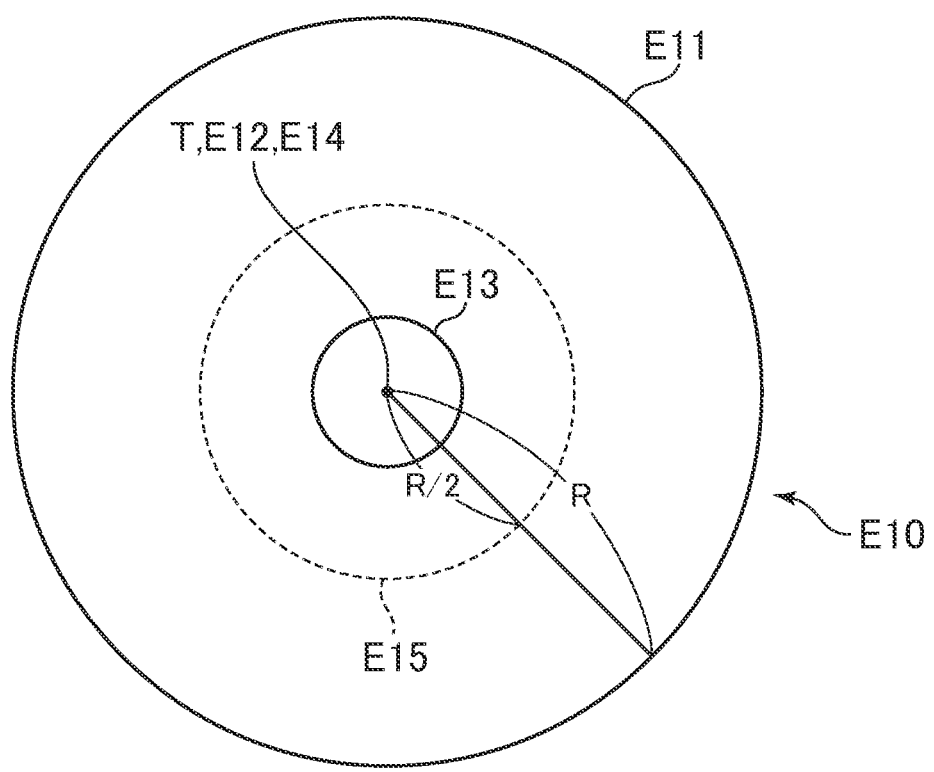
FIG. 11 is a diagram for illustrating an example of the directional pad during a sensitive mode.

FIG. 11 is a diagram for illustrating an example of the directional pad E10 in the sensitive mode. In the same manner as in FIG. 6, FIG. 11 is an illustration of the directional pad E10 displayed when a touch in the left-side area LA is started. As illustrated in FIG. 11, the directional pad E10 includes the base portion E11 and the pointer portion E13 in the sensitive mode as well. Particularly in the sensitive mode, a reference area E15 being an area smaller than the directional pad E10 (base portion E11) is set. For example, the reference area E15 is equivalent to an area obtained by reducing the display area of the base portion E11 to 1/n. In the example of FIG. 11, the reference area E15 is equivalent to an area obtained by reducing the display area of the base portion E11 to ½. That is, while the directional pad E10 (base portion E11) has a circular area having a radius R with the center point E12 being used as its center, the reference area E15 has a circular area having a radius R/2 with the center point E12 being used as its center.

Figure 12A:
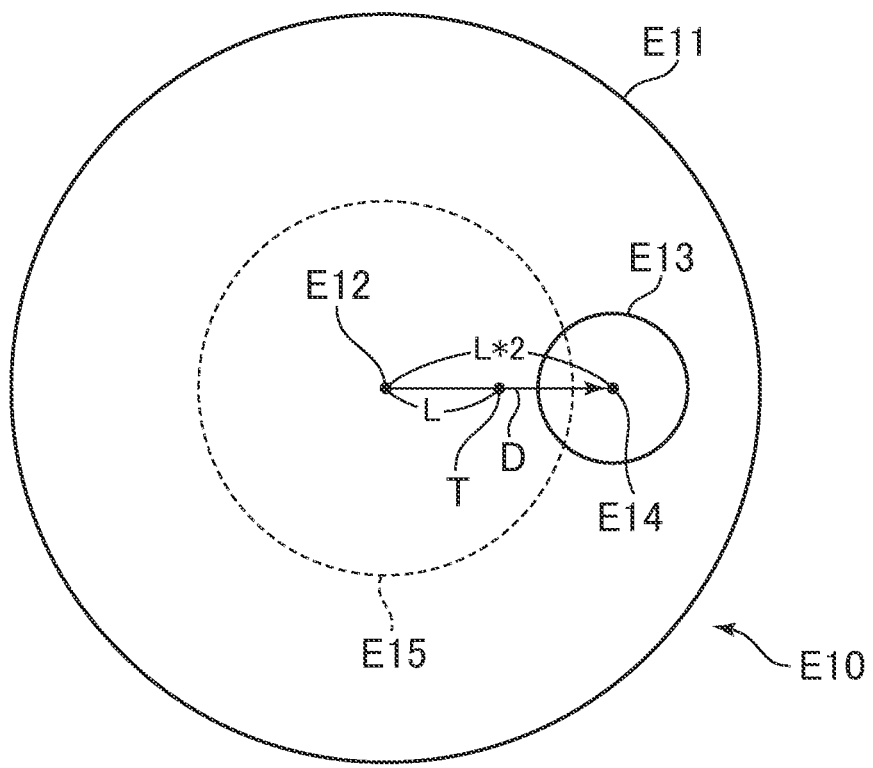
FIG. 12A is a diagram for illustrating a case in which the user has moved the touch position during the sensitive mode.

The pointer portion E13 is moved in accordance with the movement of the touch position T in the sensitive mode as well. FIG. 12A is an illustration of a case in which the touch position T has been moved to a position spaced apart from the center point E12 in the right direction by the distance L. In this case, the pointer portion E13 is moved to the position spaced apart from the center point E12 in the right direction by a distance twice as long as the distance L. That is, the pointer portion E13 is moved in the same direction as the moving direction of the touch position T by a distance twice as long as the moving distance of the touch position T.

In this case, a direction D (right direction) from the center point E12 to the center point E14 is acquired as the designated direction of the user, and the moving direction of the operation target user character UC is set to a direction corresponding to the direction D. In addition, a distance (L*2) between the center points E12 and E14 is acquired, and the moving speed of the operation target user character UC is set to a speed corresponding to the distance (L*2). The symbol "*" represents a multiplication operator.

Figure 12B:
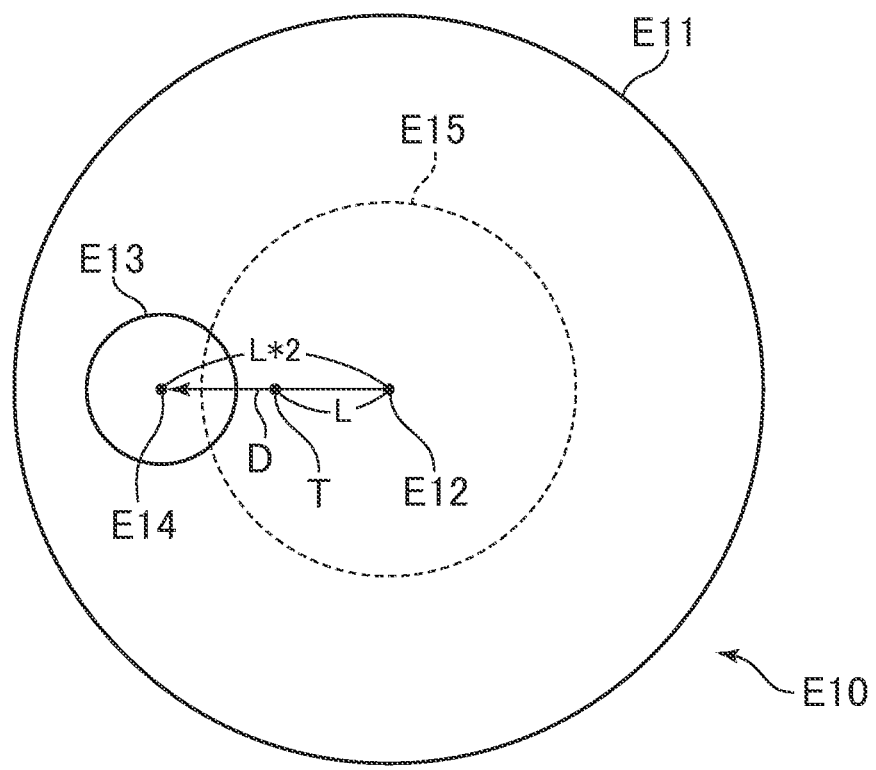
FIG. 12B is a diagram for illustrating a case in which the user has moved the touch position during the sensitive mode.

FIG. 12B is an illustration of a case in which the touch position T has been moved to a position spaced apart from the center point E12 in the left direction by the distance L. In this case, the pointer portion E13 is moved to the position spaced apart from the center point E12 in the left direction by a distance twice as long as the distance L.

In this case, a direction D (left direction) from the center point E12 to the center point E14 is acquired as the designated direction of the user, and the moving direction of the operation target user character UC is set to a direction corresponding to the direction D. In addition, a distance (L*2) between the center points E12 and E14 is acquired, and the moving speed of the operation target user character UC is set to a speed corresponding to the distance (L*2).

In the case of the virtual directional pad E10 displayed on the display 15, unlike in a case of a real directional pad, the user cannot have the feeling of operating the directional pad, and hence the moving distance of the touch position T may tend to become smaller depending on the user. In the normal mode, the pointer portion E13 is moved only by the same distance as the moving distance of the touch position T, and hence in the case of the user having such a tendency as described above, the moving speed of the user character UC may fail to become faster due to the fact that the pointer portion E13 is not moved greatly. In contrast, in the sensitive mode, the pointer portion E13 is moved by the distance twice as long as the moving distance of the touch position T, and hence even in the case of the user having such a tendency as described above, the pointer portion E13 is moved greatly, and hence such an inconvenience as described above hardly occurs.

In addition, in the normal mode, when the pointer portion E13 is moved from the position in FIG. 12A to the position in FIG. 12B, it is required to move the touch position T from the center point E14 in FIG. 12A to the position of the center point E14 in FIG. 12B. In this respect, in the case of the user having such a tendency as described above, the moving distance of the touch position T is not enough to move the pointer portion E13 to the position indicated in FIG. 12B, and in some cases, the pointer portion E13 may fail to move to a position on the left side relative to the center point E12 of the directional pad E10. In this case, although the user intends to have designated the left direction, the game system determines that the right direction has been designated. In contrast, in the sensitive mode, the pointer portion E13 is moved by the distance twice as long as the moving distance of the touch position T, and hence even in the case of the user having such a tendency as described above, the pointer portion E13 is moved greatly, and hence such an inconvenience as described above hardly occurs.

Figure 13A:
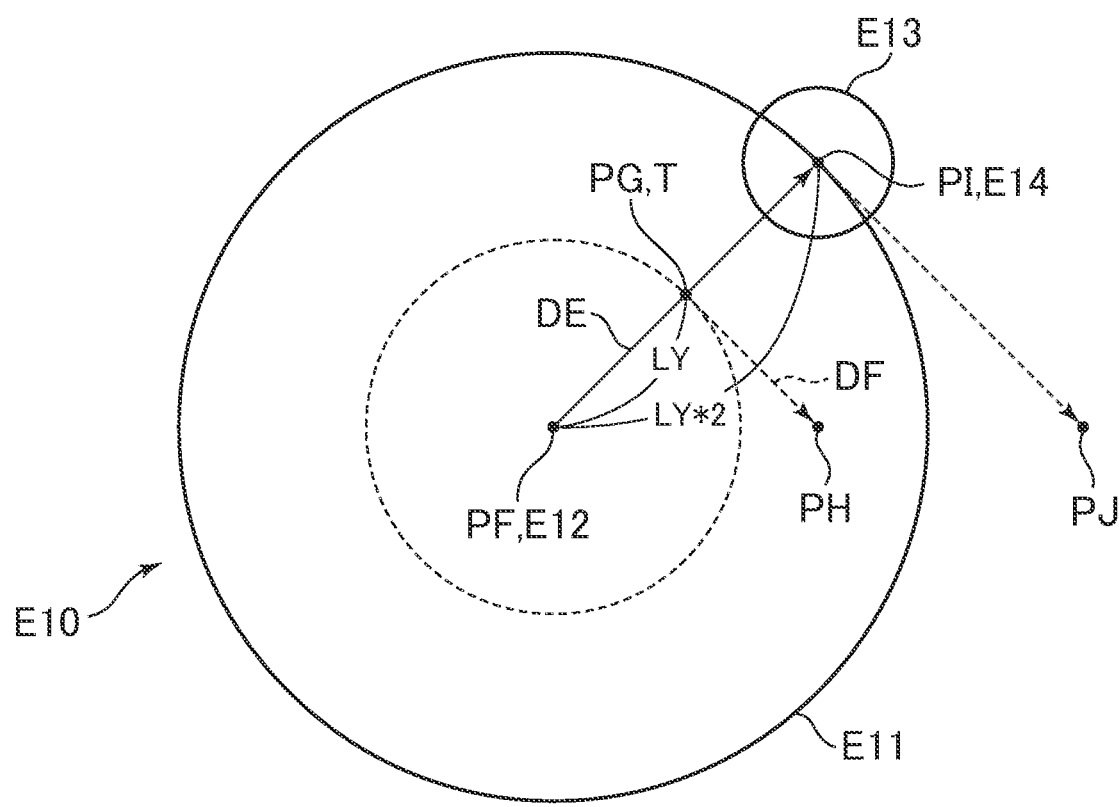
FIG. 13A is a diagram for illustrating a movement of the directional pad during the sensitive mode.
Figure 13B:
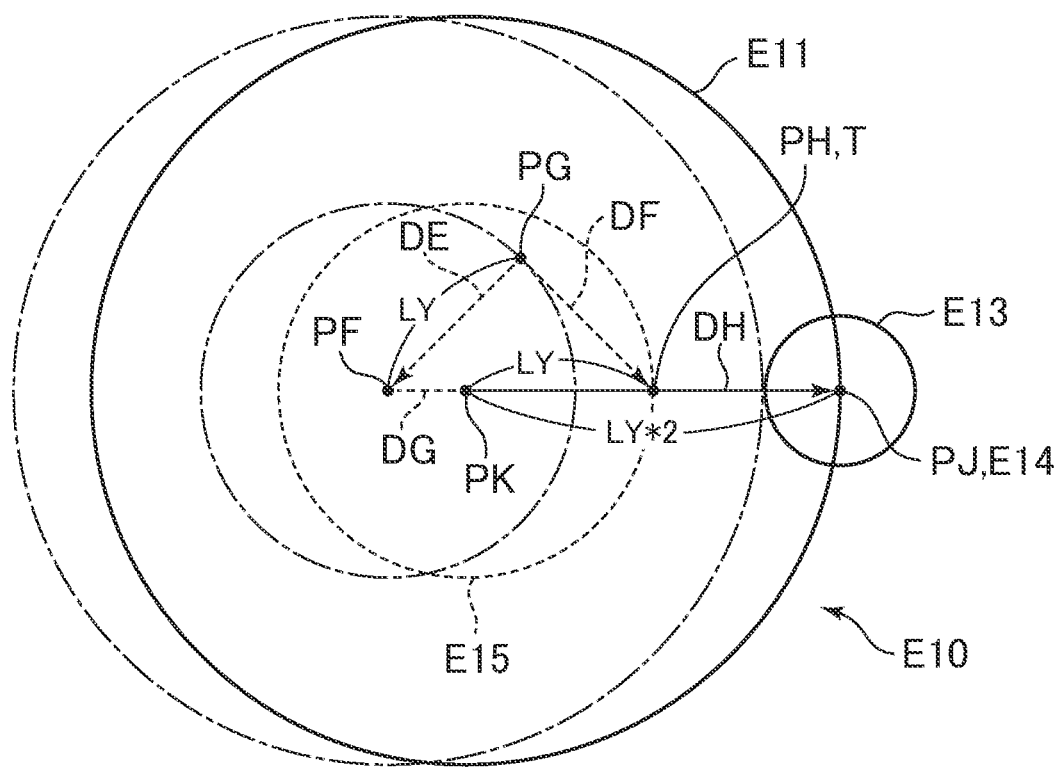
FIG. 13B is a diagram for illustrating a movement of the directional pad during the sensitive mode.

In the sensitive mode, when the touch position T is moved outward from within the reference area E15, the directional pad E10 (base portion E11 and reference area E15) is moved so that the touch position T is located in the reference area E15. FIG. 13A and FIG. 13B are diagrams for illustrating the movement of the directional pad E10 (base portion E11 and reference area E15) during the sensitive mode.

As illustrated in FIG. 13A, the center point E12 of the directional pad E10 is located at a position PF. The touch position T is located at a position PG (upper right position relative to the center point E12). The position PG is spaced apart from the center point E12 by a distance LY. The center point E14 of the pointer portion E13 is located at a position PI (upper right position relative to the center point E12) spaced apart from the center point E12 in the direction of the position PG by a distance twice as long as the distance LY. In this case, a direction DE from the position PF (center point E12 of the directional pad E10) to the position PI (center point E14 of the pointer portion E13) is acquired as the designated direction. Then, the operation target user character UC is moved in a moving direction corresponding to the direction DE at a moving speed corresponding to the distance LY*2. When the user moves, in such a state, the touch position T from the position PG to a position PH outside the reference area E15 in order to change the designated direction from the upper right direction (direction DE) to the right direction, as illustrated in FIG. 13B, the center point E14 of the pointer portion E13 is moved to a position PJ outside the base portion E11.

In addition, at this time, the directional pad E10 (base portion E11 and reference area E15) is moved in the right direction as illustrated in FIG. 13B. In FIG. 13B, the one-dot broken lines indicate the base portion E11 and the reference area E15 before the movement. In this case, first, a direction DG from the position PF being the position of the center point E12 before the movement of the touch position T in FIG. 13A to the position PH being the movement destination position of the touch position T is determined as the moving direction of the directional pad E10. Here, the direction DG represents a direction obtained by combining the direction DE from the position PF to the position PG (namely, designated direction before the movement in FIG. 13A) and a direction DF from the position PG to the position PH (namely, moving direction of the touch position T). In short, the direction DG is a direction indicated by a resultant vector of a vector from the position PF to the position PG and a vector from the position PG to the position PH.

Then, a position PK is determined as the movement destination position of the directional pad E10. The position PK is on a straight line extending from the position PF in the direction DG, and is spaced apart from the position PH by the distance LY (distance between the center point E12 and the touch position T before the movement in FIG. 13A). Then, the directional pad E10 (base portion E11 and reference area E15) is translated in the direction DG so that the center point E12 agrees with the position PK.

When the directional pad E10 (base portion E11 and reference area E15) is moved in the above-mentioned manner, a direction DH (right direction) from the center point E12 (position PK) after the movement to the center point E14 (position PJ) of the pointer portion E13 is acquired as the designated direction. As described above, while the user has moved the touch position T with the intention of changing the designated direction to the right direction, the designated direction (right direction) intended by the user is acquired by the game system by the movement method illustrated in FIG. 13B. In the movement method illustrated in FIG. 13B, the moving direction (direction DG) of the directional pad E10 is determined in consideration of both the designated direction (direction DE) before the movement and the moving direction of the touch position T (direction DF), and hence the designated direction intended by the user after the movement is acquired by the game system. Therefore, the operation target user character UC is moved in a direction intended by the user.

As illustrated in FIG. 13B, the distance between the center points E12 and E14 is the same distance (LY*2) before the movement of the directional pad E10 in FIG. 13A and after the movement of the directional pad E10 in FIG. 13B, and hence the operation target user character UC is moved at the same moving speed even after the movement.

In the sensitive mode as well, when the above-mentioned movement of the directional pad E10 (base portion E11 and reference area E15) is executed once or a plurality of times, the directional pad E10 may be moved into the right-side area RA. In the sensitive mode, in the same manner as in the normal mode in FIG. 10, when the touch position of the user has been moved into the right-side area RA after the directional pad E10 is displayed in the left-side area LA, the directional pad E10 is also moved into the right-side area RA. Therefore, even when the touch position enters the right-side area RA while the user is performing a direction designation operation through the directional pad E10, the user can continue the direction designation operation.

Figure 14:
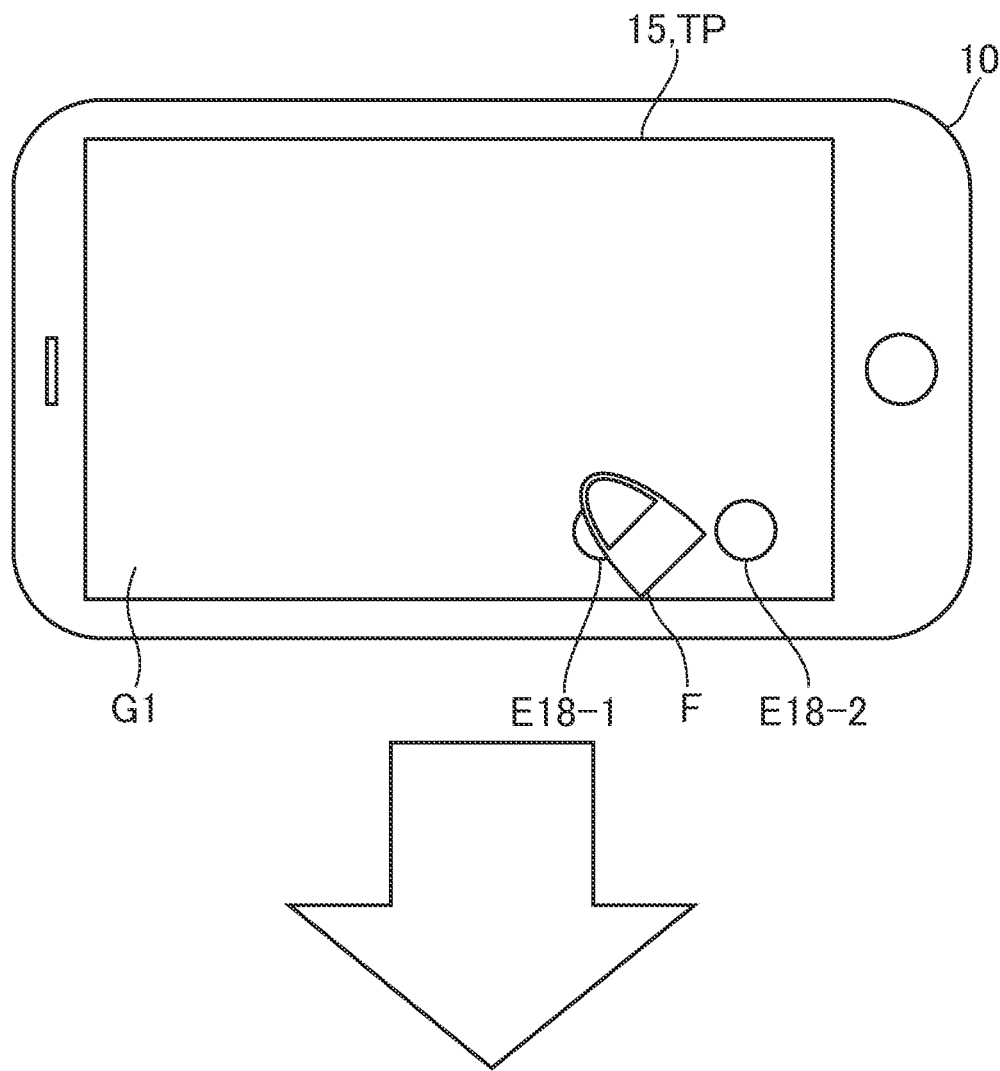
FIG. 14 is a diagram for illustrating an example of an action designation operation.
Figure 14:
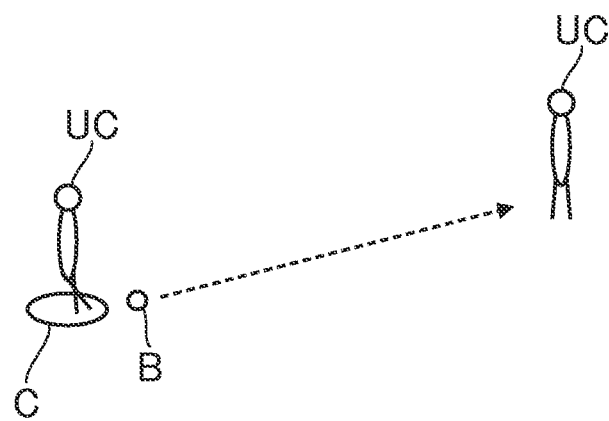

Next, a description is given of an action designation operation for causing the operation target user character UC to perform a specific action (for example, passing) other than the moving action. FIG. 14 is a diagram for illustrating an example of the action designation operation. In an actual case, for example, the user character UC and the opponent character OC located in the visual field of the virtual viewpoint VC are displayed, but are omitted in FIG. 14 for the sake of simplicity of description.

In order to perform the action designation operation on the operation target user character UC, the user performs an operation on the right-side area RA of the touch panel TP. The first button E18-1 and the second button E18-2 displayed in the right-side area RA are each associated with an action to be performed by the user character UC. For example, the first button E18-1 is associated with "passing". Therefore, for example, as illustrated in FIG. 14, when the user touches the first button E18-1 while the operation target user character UC is holding the ball B to be ready to perform a pass, the operation target user character UC performs a pass. Meanwhile, when the user touches the first button E18-1 while the operation target user character UC cannot perform a pass, a passing-ready state may be enabled to wait for the operation target user character UC to get ready to perform a pass and then allow the operation target user character UC to perform a pass.

In addition, for example, the second button E18-2 is associated with "shooting". Therefore, when the user performs a tap operation on the second button E18-2 while the operation target user character UC is holding the ball B in its opponent's area to be ready to perform a shot, the operation target user character UC performs a shot. At this time, a strength (or angle) of the shooting may be set based on a time period taken for the user to perform the tap operation (namely, time period taken after the user touches the second button E18-2 by the finger or other such body part until the user releases the finger or other such body part from the touch panel TP). Meanwhile, when the user performs a tap operation on the second button E18-2 while the operation target user character UC cannot perform a shot, a shooting-ready state may be enabled to wait for the operation target user character UC to get ready to perform a shot and then allow the operation target user character UC to perform a shot. The "opponent's area" refers to an area in the pitch PT on the goal GL side of the opponent team relative to the halfway line HL.

For example, the action associated with the first button E18-1 or the second button E18-2 may differ between the time of attack and the time of defense. As an example, when the user touches the first button E18-1 while the opponent team is holding the ball B, the operation target user character UC may perform a sliding tackle. In addition, for example, the action associated with the first button E18-1 or the second button E18-2 may differ depending on the position of the operation target user character UC. As an example, when the user performs a tap operation on the second button E18-2 while the operation target user character UC is holding the ball B in its own area, the operation target user character UC may kick the ball B far away from the goal GL of the user team. The "own area" refers to an area in the pitch PT on the goal GL side of the user team relative to the halfway line HL.

The image of the first button E18-1, the second button E18-2, or other such virtual button may be inhibited from being displayed in the right-side area RA. For example, when the user performs a flick operation, a tap operation, the double-tap operation, or other such operation at any given position in the right-side area RA, the operation target user character UC may perform an action associated with the operation performed by the user. The "flick operation" refers to an operation in which, for example, the user touches the touch panel TP and then releases the touch after quickly moving the touch position while maintaining the touch. The "double-tap operation" refers to an operation of, for example, performing a tap operation two times in a row.

Figure 15:
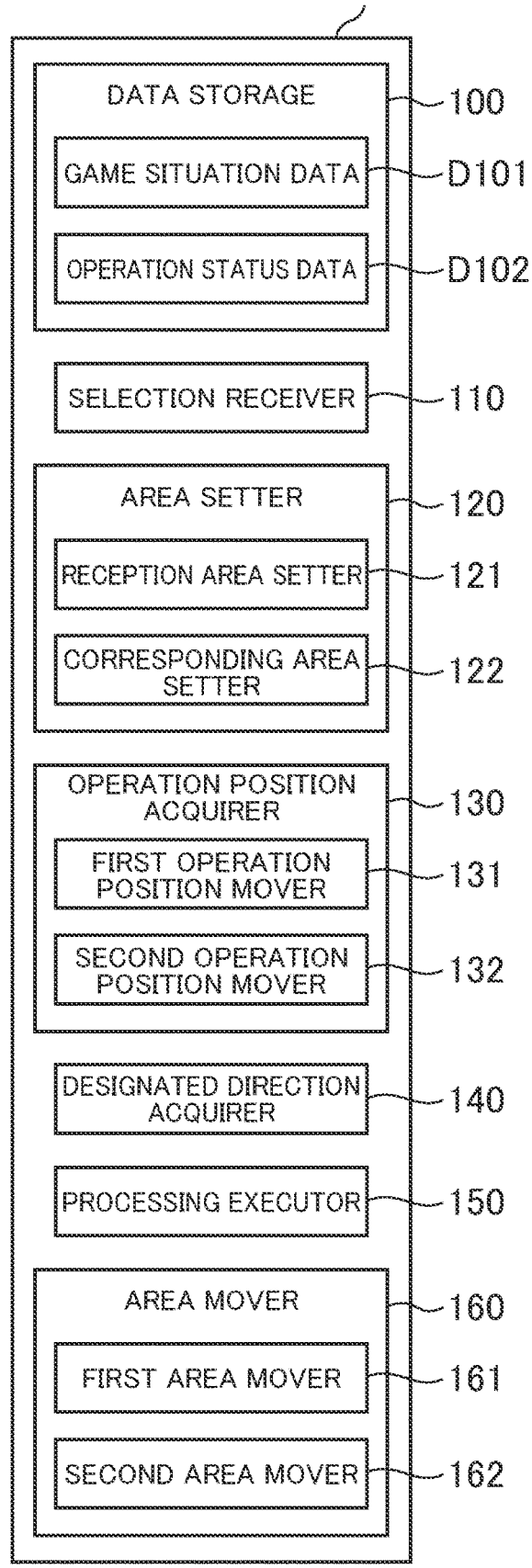
FIG. 15 is a functional block diagram for illustrating the game system.

[3. Functional Blocks] A description is given of a configuration for implementing such a game as described above. FIG. 15 is a functional block diagram for illustrating main functional blocks implemented in the game system 1. As illustrated in FIG. 15, the game system 1 includes a data storage 100, a selection receiver 110, an area setter 120, an operation position acquirer 130, a designated direction acquirer 140, a processing executor 150, and an area mover 160.

For example, those functional blocks are implemented by the game terminal 10. That is, the data storage 100 is implemented by the storage 12, and the other functional blocks are implemented by the controller 11. The data storage 100 may be implemented by a storage of another device accessible by the game terminal 10. In another case, the above-mentioned functional blocks may be implemented by the server 30. In still another case, a part of the above-mentioned functional blocks may be implemented by the game terminal 10, while the rest of the functional blocks may be implemented by the server 30.

[3-1] The data storage 100 stores data required for executing a game. The following description is given of game situation data D101 and operation status data D102 as examples of the data stored in the data storage 100.

The game situation data D101 is data indicating a situation of a game being executed. The game situation data D101 is repeatedly updated during the execution of the game. For example, the game situation data D101 includes data indicating a current situation of the virtual world VW and data indicating the situation of a match.

Examples of the data indicating the current situation of the virtual world VW include data indicating a state of each game character, data indicating a state of the ball B, and data indicating a state of the virtual viewpoint VC. Examples of the data indicating the state of the game character include: data indicating, for example, identification information, a position, a direction, posture, a moving direction, and a moving speed of each of the user characters UC and the opponent characters OC; and data for identifying the user character UC set as the operation target. Examples of the data indicating the state of the ball B include: data indicating, for example, a position, a moving direction, and a moving speed of the ball B; and data for identifying the game character holding the ball B. Examples of the data indicating the state of the virtual viewpoint VC include data indicating, for example, a position, a line-of-sight direction, and a field angle of the virtual viewpoint VC. Examples of the data indicating the situation of the match include data indicating, for example, a score of the user team, a score of the opponent team, and an elapsed time of the match.

The operation status data D102 is data indicating an operation status of the user. For example, the operation status data D102 includes data indicating a history of the touch position from the start of a touch on the touch panel TP up to the present time. For example, the operation status data D102 also includes data on the directional pad E10. Examples of the data on the directional pad E10 include data indicating the operation mode of the directional pad E10, data indicating whether or not the directional pad E10 is being displayed, and data indicating a current position of the directional pad E10 (center points E12 and E14).

The data stored in the data storage 100 is not limited to the above-mentioned examples. The data storage 100 also stores other data required for executing the game. For example, data (for example, coordinate data indicating positions of a boundary and an edge) for identifying the left-side area LA and the right-side area RA is stored as well. For example, motion data for defining an action of a character and data indicating a relationship between the operation content and the action of the character are stored as well.

[3-2] The area setter 120 includes a reception area setter 121. The reception area setter 121 sets the reception area for receiving a direction designation operation on the touch panel TP.

In this case, the "direction designation operation" refers to an operation to be performed by the user in order to designate (input) a direction. The "setting the reception area on the touch panel" refers to setting a partial area of the touch panel TP as the reception area.

The "reception area" refers to an area to be used for receiving the direction designation operation. The "reception area" may be a visible area, or an invisible area. That is, the "reception area" may be displayed, or may not be displayed. For example, when a virtual operation member (e.g., virtual direction button or virtual direction lever) for performing a direction designation operation is displayed on the display 15, an area in which the virtual operation member is displayed is equivalent to the "reception area". A hidden area set separately from the area in which the virtual operation member is displayed may be equivalent to the "reception area". For example, the "reception area" is set when a touch on the touch panel TP is started. In this case, the "reception area" is set based on the touch position. For example, such an area as to include the touch position is set as the "reception area". The "reception area" may be set when the touch panel TP is not being touched. In addition, an initial position of the "reception area" may be set at a position determined in advance. In the above-mentioned example of a soccer game, the directional pad E10 (base portion E11) corresponds to an example of the "reception area". That is, the area in which the directional pad E10 (base portion E11) is displayed corresponds to an example of the "reception area".

For example, when the touch panel TP is touched in a first area of the touch panel TP, the reception area setter 121 sets the reception area in the first area based on the touch position, while the reception area setter 121 avoids setting the reception area when the touch panel TP is touched in a second area of the touch panel TP, which is different from the first area.

In the above-mentioned example of the soccer game, the left-side area LA of the touch panel TP corresponds to an example of the "first area", and the right-side area RA corresponds to an example of the "second area". In another case, the right-side area RA may correspond to an example of the "first area", and the left-side area LA may correspond to an example of the "second area". In still another case, one of an upper area and a lower area set on the touch panel TP relative to the center of the touch panel TP may correspond to an example of the "first area", and the other may correspond to an example of the "second area".

In the above-mentioned case of the soccer game, when the touch on the left-side area LA (one example of the first area) of the touch panel TP is started, the reception area setter 121 displays the directional pad E10 (one example of the reception area) in the left-side area LA. In this case, the reception area setter 121 displays the directional pad E10 with the touch position T being used as the center point E12. Even when the touch on the right-side area RA (one example of the second area) of the touch panel TP is started, the reception area setter 121 avoids displaying the directional pad E10.

As illustrated in FIG. 15, the area setter 120 includes a corresponding area setter 122. The corresponding area setter 122 is a functional block relating to the sensitive mode of the soccer game described above.

The corresponding area setter 122 sets a corresponding area, which is smaller than the reception area. When the touch panel TP is touched in the first area, the corresponding area setter 122 sets the corresponding area in the first area based on the touch position, and avoids setting the corresponding area when the touch panel is touched in the second area, which is different from the first area.

In this case, the "corresponding area" refers to an area corresponding to the reception area, and is set smaller than the reception area. For example, the "corresponding area" refers to an area equivalent to an area obtained by reducing the reception area. Specifically, the "corresponding area" refers to an area equivalent to an area obtained by reducing the reception area to 1/n (where n represents a positive numerical value larger than 1). In general, the "corresponding area" is an invisible area, and is not displayed on the display 15. However, the "corresponding area" may be a visible area, and may be displayed on the display 15. For example, the "corresponding area" is set so that a reference position (for example, center point) of the "corresponding area" agrees with the reference position of the reception area.

In the above-mentioned example of the soccer game, the reference area E15 in the sensitive mode corresponds to an example of the "corresponding area". That is, in the above-mentioned case of the soccer game, when the touch on the left-side area LA (one example of the first area) of the touch panel TP is started with the sensitive mode being selected, the corresponding area setter 122 sets an invisible area equivalent to an area obtained by reducing the display area (one example of the "reception area") of the base portion E11 of the directional pad E10 to ½ in the left-side area LA as the reference area E15. In this case, the corresponding area setter 122 sets the reference area E15 with the touch position T (namely, center point E12 of the base portion E11) being used as its center. Even when the touch on the right-side area RA (one example of the second area) of the touch panel TP is started with the sensitive mode being selected, the corresponding area setter 122 avoids setting the reference area E15.

[3-3] The operation position acquirer 130 acquires (sets) an operation position corresponding to a touch position on the touch panel TP.

In this case, the "touch position on the touch panel TP" refers to a position at which the touch panel TP is being touched. The "operation position" refers to an operation position relating to a direction designation operation. That is, the "operation position" refers to a position for designating a direction. In other words, the "operation position" refers to a position indicating a designated direction. In the above-mentioned example of the soccer game, the center point E14 of the pointer portion E13 corresponds to an example of the "operation position".

The "acquiring (setting) the operation position corresponding to the touch position" refers to, for example, acquiring (setting) the touch position itself as the operation position. In another case, the "acquiring (setting) the operation position corresponding to the touch position" may refer to, for example, acquiring (setting) a position other than the touch position, which is obtained based on the touch position, as the operation position. For example, the "acquiring (setting) the operation position corresponding to the touch position" may refer to acquiring (setting) a position having a predetermined relationship with the touch position as the operation position.

The operation position acquirer 130 moves the operation position in accordance with the movement of the touch position.

In this case, the "moving the operation position in accordance with the movement of the touch position" refers to, for example, moving the operation position in a direction corresponding to the moving direction of the touch position. The "direction corresponding to the moving direction of the touch position" refers to a direction having a predetermined correspondence relationship with the moving direction of the touch position. For example, the "direction corresponding to the moving direction of the touch position" refers to the same or substantially the same direction as the moving direction of the touch position. The "direction corresponding to the moving direction of the touch position" is not required to refer to the same or substantially the same direction as the moving direction of the touch position, and may refer to another direction having a predetermined correspondence relationship with the moving direction of the touch position. The "substantially the same direction as a direction X" refers to a direction that deviates from the direction X to a degree so small that the user cannot recognize the deviation.

The "moving the operation position in accordance with the movement of the touch position" refers to, for example, moving the operation position by a distance corresponding to the moving distance of the touch position. The "distance corresponding to the moving distance of the touch position" refers to a distance having a predetermined correspondence relationship with the moving distance of the touch position. For example, the "distance corresponding to the moving distance of the touch position" refers to the same or substantially the same distance as the moving distance of the touch position. In another case, the "distance corresponding to the moving distance of the touch position" may refer to a distance obtained by multiplying the moving distance of the touch position by a predetermined coefficient (positive value larger than 1), or may refer to a distance obtained by adding a predetermined distance to the moving distance of the touch position. The "substantially the same distance as a distance X" refers to a distance that differs from the distance X to a degree so small that the user cannot recognize the difference.

As illustrated in FIG. 15, the operation position acquirer 130 includes a first operation position mover 131 and a second operation position mover 132. The first operation position mover 131 is a functional block relating to the normal mode of the soccer game described above, and the second operation position mover 132 is a functional block relating to the sensitive mode of the soccer game described above.

The first operation position mover 131 moves the operation position in the direction corresponding to the moving direction of the touch position by the moving distance of the touch position in accordance with the movement of the touch position.

In this case, the "moving the operation position in the direction corresponding to the moving direction of the touch position by the moving distance of the touch position" refers to setting a "position spaced apart from the current operation position in the direction corresponding to the moving direction of the touch position by the moving distance of the touch position" as a new operation position.

The second operation position mover 132 moves the operation position in the direction corresponding to the moving direction of the touch position by a distance longer than the moving distance of the touch position in accordance with the movement of the touch position.

In this case, the "distance longer than the moving distance of the touch position" refers to, for example, a distance obtained by multiplying the moving distance of the touch position by a predetermined coefficient (positive value larger than 1). In another case, the "distance longer than the moving distance of the touch position" may refer to, for example, a distance obtained by adding a predetermined distance to the moving distance of the touch position.

The "moving the operation position in the direction corresponding to the moving direction of the touch position by a distance longer than the moving distance of the touch position" refers to setting a "position spaced apart from the current operation position in the direction corresponding to the moving direction of the touch position by a distance longer than the moving distance of the touch position" as a new operation position.

For example, the second operation position mover 132 sets the operation position so that a positional relationship between the operation position and the reference position corresponding to the reception area corresponds to a positional relationship between the touch position and the reference position corresponding to the corresponding area. The second operation position mover 132 moves, in accordance with the movement of the touch position, the operation position in the direction corresponding to the moving direction of the touch position by a distance obtained by increasing the moving distance of the touch position based on a relative size of the reception area with respect to the corresponding area.

In this case, the "setting the operation position so that a positional relationship between the operation position and the reference position corresponding to the reception area corresponds to a positional relationship between the touch position and the reference position corresponding to the corresponding area" refers to setting the operation position so that a direction from the reference position corresponding to the reception area to the operation position becomes a direction corresponding to a direction from the reference position corresponding to the corresponding area to the touch position and so that a distance between the reference position corresponding to the reception area and the operation position becomes a distance corresponding to a distance between the reference position corresponding to the corresponding area and the touch position.

Note that, the "direction corresponding to the direction from the reference position to the touch position" refers to a direction having a predetermined correspondence relationship with the direction from the reference position to the touch position. For example, the "direction corresponding to the direction from the reference position to the touch position" refers to the same or substantially the same direction as the direction from the reference position to the touch position. In another case, the "direction corresponding to the direction from the reference position to the touch position" is not required to be the same or substantially the same direction as the direction from the reference position to the touch position, and may be another direction having a predetermined correspondence relationship with the direction from the reference position to the touch position.

The "distance corresponding to the distance between the reference position and the touch position" refers to a distance having a predetermined correspondence relationship with the distance between the reference position and the touch position. For example, the "distance corresponding to the distance between the reference position and the touch position" may refer to a distance obtained by multiplying the distance between the reference position and the touch position by a predetermined coefficient (positive value larger than 1), or may refer to a distance obtained by adding a predetermined distance to the distance between the reference position and the touch position. In another case, the "distance corresponding to the distance between the reference position and the touch position" may refer to the same or substantially the same distance as the distance between the reference position and the touch position.

The "distance obtained by increasing the moving distance of the touch position based on the relative size of the reception area with respect to the corresponding area" refers to, for example, a distance obtained by multiplying the moving distance of the touch position by a coefficient (positive numerical value larger than 1) corresponding to the relative size of the reception area with respect to the corresponding area. In another case, the "distance obtained by increasing the moving distance of the touch position based on the relative size of the reception area with respect to the corresponding area" may refer to, for example, a distance obtained by adding the distance corresponding to the relative size of the reception area with respect to the corresponding area to the moving distance of the touch position.

For example, when the corresponding area is equivalent to an area obtained by reducing the reception area to 1/n (where n represents a positive numerical value larger than 1), the second operation position mover 132 moves, in accordance with the movement of the touch position, the operation position in the direction corresponding to the moving direction of the touch position by a distance obtained by multiplying the moving distance of the touch position by n.

In the above-mentioned case of the soccer game, in the normal mode, the operation position acquirer 130 (first operation position mover 131) acquires the touch position T (one example of the operation position), and displays the pointer portion E13 so that the touch position T becomes the center point E14. Meanwhile, in the sensitive mode, the operation position acquirer 130 (second operation position mover 132) acquires a position (another example of the operation position) spaced apart from the center point E12 of the base portion E11 in the direction of the touch position T by a distance twice as long as the distance between the center point E12 and the touch position T, and displays the pointer portion E13 so that the acquired position becomes the center point E14.

[3-4] The designated direction acquirer 140 acquires the designated direction based on a direction from the reference position corresponding to the reception area to the operation position.

In this case, the "reference position corresponding to the reception area" refers to a position to be used as a reference when the designated direction is to be acquired. For example, the position of a representative point in the reception area is set as the "reference position". Specifically, for example, the center point of the reception area is set as the "reference position". The position other than the center point of the reception area may be set as the "reference position". In the above-mentioned example of the soccer game, the center point E12 of the directional pad E10 (base portion E11) corresponds to an example of the "reference position".

The "designated direction" refers to a direction designated by the direction designation operation. In other words, the "designated direction" refers to a direction designated (input) by the user. The "acquiring the designated direction based on the direction from the reference position to the operation position" refers to, for example, acquiring a direction corresponding to the direction from the reference position to the operation position as the designated direction. In this case, the "direction corresponding to the direction from the reference position to the operation position" refers to a direction having a predetermined correspondence relationship with the direction from the reference position to the operation position. For example, the "direction corresponding to the direction from the reference position to the operation position" refers to the same or substantially the same direction as the direction from the reference position to the operation position. When the directions that can be designated by the user are limited to a finite number of directions (for example, four directions or eight directions), the "direction corresponding to the direction from the reference position to the operation position" is a direction being the closest to the direction from the reference position to the operation position among the finite number of directions.

In the above-mentioned case of the soccer game, the designated direction acquirer 140 acquires a direction from the center point E12 of the directional pad E10 (base portion E11) to the center point E14 of the pointer portion E13 as the designated direction. In a state illustrated in, for example, FIG. 8, the designated direction acquirer 140 acquires the up direction as the designated direction. In another state illustrated in, for example, FIG. 9A or FIG. 13A, the designated direction acquirer 140 acquires the upper right direction as the designated direction. In still another state illustrated in, for example, FIG. 9B, FIG. 12A, or FIG. 13B, the designated direction acquirer 140 acquires the right direction as the designated direction. In yet another state illustrated in, for example, FIG. 12B, the designated direction acquirer 140 acquires the left direction as the designated direction.

[3-5] The processing executor 150 executes processing based on the designated direction acquired by the designated direction acquirer 140. For example, the processing executor 150 executes game processing based on the designated direction. The processing executor 150 may execute the game processing based on the designated direction and the distance between the reference position and the operation position.

In this case, the "game processing" refers to processing relating to a game. The "executing the game processing based on the designated direction" refers to, for example, setting an item (for example, parameter) relating to the game based on the designated direction. For example, a direction relating to the game corresponds to an example of the "item relating to the game". The "executing the game processing based on the designated direction and the distance between the reference position and the operation position" refers to setting a first item (for example, first parameter) relating to the game based on the designated direction and setting a second item (for example, second parameter) relating to the game based on the distance. For example, the direction relating to the game corresponds to an example of the "first item", and an item other than the direction relating to the game corresponds to an example of the "second item".

For example, control processing relating to the operation target of the user corresponds to an example of the "game processing", and the processing executor 150 executes the control processing relating to the operation target of the user. A direction relating to the action of the operation target of the user corresponds to an example of the "direction relating to the game", and a degree (for example, speed or strength) relating to the action of the operation target of the user corresponds to an example of the "item other than the direction relating to the game".

The "operation target" refers to an object to be operated by the user. The "object" is displayed on the display 15, and can be a target to be operated by the user. For example, a character or a vehicle that performs an action in accordance with the user's operation and a cursor that is moved in accordance with the user's operation correspond to examples of the "object". In the above-mentioned example of the soccer game, the operation target user character UC corresponds to an example of the "operation target".

Examples of the "control processing relating to the operation target" include movement control processing for the operation target and control processing other than the movement control processing for the operation target. The "movement control processing for the operation target" refers to processing for moving the operation target. The "control processing other than the movement control processing for the operation target" refers to, for example, processing for causing the operation target to perform an action other than the moving action.

For example, the processing executor 150 executes the movement control processing for the operation target based on the designated direction. When the touch panel TP is touched in the second area, the processing executor 150 also executes the control processing relating to the operation target other than the movement control processing based on a touch position or a movement locus of the touch position.

In this case, the "executing the movement control processing for the operation target based on the designated direction" refers to, for example, moving the operation target in the moving direction based on the designated direction. The "movement locus of the touch position" refers to a path along which the touch position has been moved. In other words, the "movement locus of the touch position" refers to a locus drawn when the user performs a slide operation or a flick operation while keeping the finger or other such body part touching the touch panel TP.

The "control processing other than the movement control processing" refers to, for example, processing for causing the operation target to perform a predetermined action (action other than the moving action). The "executing the control processing other than the movement control processing based on a touch position or a movement locus of the touch position" refers to, for example, determining based on the touch position or the movement locus of the touch position whether or not a tap operation, a double-tap operation, a flick operation, or a slide operation has been performed on the touch panel TP in the second area and executing the control processing other than the movement control processing based on a result of the determination. Specifically, the "executing the control processing other than the movement control processing based on a touch position or a movement locus of the touch position" refers to causing the operation target to perform an action (action other than the moving action) associated with the performed operation when a tap operation, a double-tap operation, a flick operation, or a slide operation has been performed on the touch panel TP in the second area.

In another case, the "executing the control processing other than the movement control processing based on a touch position or a movement locus of the touch position" may refer to, for example, causing the operation target to perform an action (action other than the moving action) associated with the touch position or the movement locus of the touch position. Specifically, the "executing the control processing other than the movement control processing based on a touch position or a movement locus of the touch position" may refer to, for example, causing the operation target to perform an action associated with a display element (for example, button or icon) when the display element is displayed at the touch position. In addition, the "executing the control processing other than the movement control processing based on a touch position or a movement locus of the touch position" may refer to, for example, causing the operation target to perform an action associated with a predetermined movement locus when the predetermined movement locus is input as the movement locus of the touch position.

In the above-mentioned case of the soccer game, the processing executor 150 executes, based on the designated direction, processing for moving the operation target user character UC (one example of the movement control processing). Specifically, the processing executor 150 sets, based on the designated direction, the moving direction of the operation target user character UC (one example of the "direction relating to the action of the operation target of the user"). That is, the processing executor 150 sets a direction corresponding to the designated direction in the virtual world VW as the moving direction of the operation target user character UC. For example, in a case where the up direction in the directional pad E10 is associated with the positive Zw-axis direction in the virtual world VW, when the up direction is acquired as the designated direction, the processing executor 150 sets the positive Zw-axis direction as the moving direction of the operation target user character UC.

The processing executor 150 also sets the moving speed of the operation target user character UC (one example of the "degree relating to the action of the operation target of the user") based on the distance between the center point E12 of the directional pad E10 and the center point E14 of the pointer portion E13. That is, the processing executor 150 sets the moving speed corresponding to the distance between the center points E12 and E14 as the moving speed of the operation target user character UC.

In addition, when the touch panel TP is touched in the right-side area RA (one example of the "second area") of the touch panel TP, the processing executor 150 executes, based on the touch position or the movement locus of the touch position, processing for causing the operation target user character UC to perform a pass or perform a shot (one example of the "control processing other than the movement control processing"). For example, the processing executor 150 causes the operation target user character UC to perform a pass when the first button E18-1 in the right-side area RA is touched, and causes the operation target user character UC to perform a shot when a tap operation is performed on the second button E18-2 in the right-side area RA. The processing executor 150 may cause the operation target user character UC to perform a pass when a flick operation is performed in the right-side area RA, and may cause the operation target user character UC to perform a shot when a double-tap operation is performed.

The soccer game described above may be configured so that the passing direction or the shooting direction of the operation target user character UC can be designated through use of the directional pad E10. That is, the processing executor 150 may set the passing direction or the shooting direction of the operation target user character UC (another example of the "direction relating to the action of the operation target of the user") based on the designated direction. The processing executor 150 may also set a kicking force to be exerted on the ball B by the operation target user character UC at the time of the passing or the shooting (another example of the "degree relating to the action of the operation target of the user") based on the distance between the center points E12 and E14.

[3-6] The area mover 160 includes a first area mover 161 and a second area mover 162. The first area mover 161 is a functional block relating to the normal mode of the soccer game described above, and the second area mover 162 is a functional block relating to the sensitive mode of the soccer game described above.

[3-6-1] The first area mover 161 moves the reception area as the operation position is moved from the inside of the reception area toward the outside of the reception area. As the operation position is moved from a first position inside the reception area toward a second position outside the reception area, the first area mover 161 moves the reception area in a direction corresponding to a direction from a third position, which is the reference position when the operation position is the first position, to the second position. For example, the first area mover 161 moves the reception area so that a fourth position, which is spaced apart from the second position in a direction corresponding to a direction to the third position by a distance corresponding to the distance between the first position and the third position, becomes the reference position.

The first area mover 161 further moves the reception area into the second area as the operation position is moved into the second area of the touch panel TP after the reception area is set by the reception area setter 121.

In this case, the "moving the reception area as the operation position is moved from the inside of the reception area toward the outside of the reception area" refers to moving the reception area in accordance with the movement of the operation position as the operation position is moved from a position inside the reception area toward a position outside the reception area. For example, the "moving the reception area as the operation position is moved from the inside of the reception area toward the outside of the reception area" refers to moving the reception area along with the operation position so that the operation position is included in the reception area when the operation position is moved from a position inside the reception area toward a position outside the reception area. The "moving the reception area" refers to translating the reception area, that is, moving all points in the reception area in a predetermined direction by a predetermined distance.

The "direction corresponding to the direction from the third position to the second position" refers to, for example, the same or substantially the same direction as the direction from the third position to the second position. The "moving the reception area in the direction corresponding to the direction from the third position to the second position" refers to, for example, moving the reception area in the same or substantially the same direction as the direction from the third position to the second position. For example, the "moving the reception area in the direction corresponding to the direction from the third position to the second position" refers to moving the reception area in the direction corresponding to the direction from the third position to the second position so that the second position is included in the reception area.

The "direction corresponding to the direction to the third position" refers to the same or substantially the same direction as a direction to the third position. The "distance corresponding to the distance between the first position and the third position" refers to the same or substantially the same distance as the distance between the first position and the third position. The "substantially the same distance as the distance X" refers to, for example, a distance that differs from the distance X to a degree so small that the user cannot recognize the difference.

In the normal mode of the soccer game described above, for example, as illustrated in FIG. 9A and FIG. 9B, when the touch position T (one example of the operation position) is moved from the position PB (one example of the first position) inside the base portion E11 (one example of the reception area) of the directional pad E10 to the position PC (one example of the second position) outside the base portion E11, the first area mover 161 moves the base portion E11 in the direction DC from the position PA (one example of the third position) to the position PC. The first area mover 161 moves the directional pad E10 (base portion E11) so that the center point E12 (one example of the reference position) becomes the position PE (one example of the fourth position) spaced apart in the direction from the position PC to the position PA by the distance LX.

In addition, for example, as illustrated in FIG. 10, when the touch position T (one example of the operation position) is moved into the right-side area RA (one example of the second area) after the directional pad E10 is displayed in the left-side area LA (one example of the first area), the first area mover 161 moves the directional pad E10 (base portion E11 and pointer portion E13) into the right-side area RA.

[3-6-2] The second area mover 162 moves the corresponding area and the reception area as the touch position is moved from the inside of the corresponding area toward the outside of the corresponding area.

The second area mover 162 further moves the reception area and the corresponding area into the second area as the touch position is moved into the second area after the reception area and the corresponding area are set by the area setter 120.

In this case, the "moving the corresponding area and the reception area as the touch position is moved from the inside of the corresponding area toward the outside of the corresponding area" refers to moving the corresponding area and the reception area in accordance with the movement of the touch position as the touch position is moved from a position inside the corresponding area toward a position outside the corresponding area. For example, the "moving the corresponding area and the reception area as the touch position is moved from the inside of the corresponding area toward the outside of the corresponding area" refers to moving the corresponding area and the reception area along with the touch position so that the touch position is included in the corresponding area when the touch position is moved from a position inside the corresponding area toward a position outside the corresponding area and so that the operation position is included in the reception area. The "moving the corresponding area and the reception area" refers to translating the corresponding area and translating the reception area, that is, moving all points in the corresponding area in a predetermined direction by a predetermined distance and moving all points in the reception area in a predetermined direction by a predetermined distance.

In the sensitive mode of the soccer game described above, for example, as illustrated in FIG. 13A and FIG. 13B, when the touch position T is moved from the position PG inside the reference area E15 (one example of the corresponding area) to the position PH outside the reference area E15, the second area mover 162 moves the base portion E11 and the reference area E15 in the direction DG from the position PF to the position PH. The second area mover 162 moves the directional pad E10 (base portion E11 and reference area E15) so that the center point E12 (one example of the reference position) becomes the position PK spaced apart in the direction from the position PH to the position PF by the distance LY.

The case in which "the touch position T is moved from the position PG to the position PH" refers to a case in which the center point E14 of the pointer portion E13 (one example of the "operation position") is moved from the position PI inside the base portion E11 to the position PJ outside the base portion E11. Therefore, it can be said that the second area mover 162 moves the directional pad E10 (base portion E11 and reference area E15) in the direction DG from the position PF to the position PJ when the center point E14 of the pointer portion E13 is moved from the position PI inside the base portion E11 to the position PJ outside the base portion E11. That is, it can also be said that the second area mover 162 moves the directional pad E10 (base portion E11 and reference area E15) so that the center point E12 becomes the position PK spaced apart in the direction from the position PJ to the position PF by the distance twice as long as the distance LY.

Similarly in the sensitive mode, for example, as illustrated in FIG. 10, when the touch position T (one example of the operation position) is moved into the right-side area RA (one example of the second area) after the directional pad E10 is displayed in the left-side area LA (one example of the first area), the second area mover 162 moves the directional pad E10 (base portion E11, pointer portion E13, and reference area E15) into the right-side area RA.

[3-7] The selection receiver 110 receives a selection of any one of the first operation position mover 131 and the second operation position mover 132 as means for moving the operation position.

In this case, the "receiving a selection of any one of the first operation position mover 131 and the second operation position mover 132" refers to displaying an image for selecting any one of the first operation position mover 131 and the second operation position mover 132 on the display 15 to receive a selection operation for selecting any one of the first operation position mover 131 and the second operation position mover 132. In another case, the "receiving a selection of any one of the first operation position mover 131 and the second operation position mover 132" may refer to receiving data indicating a result of selecting any one of the first operation position mover 131 and the second operation position mover 132.

In the above-mentioned case of the soccer game, the selection receiver 110 displays the operation mode selection image G2 illustrated in FIG. 7 on the display 15 to receive a selection of any one of the normal mode corresponding to the first operation position mover 131 and the sensitive mode corresponding to the second operation position mover 132.

[4. Processing] Next, processing to be executed in the game system 1 is described.

Figure 16A:
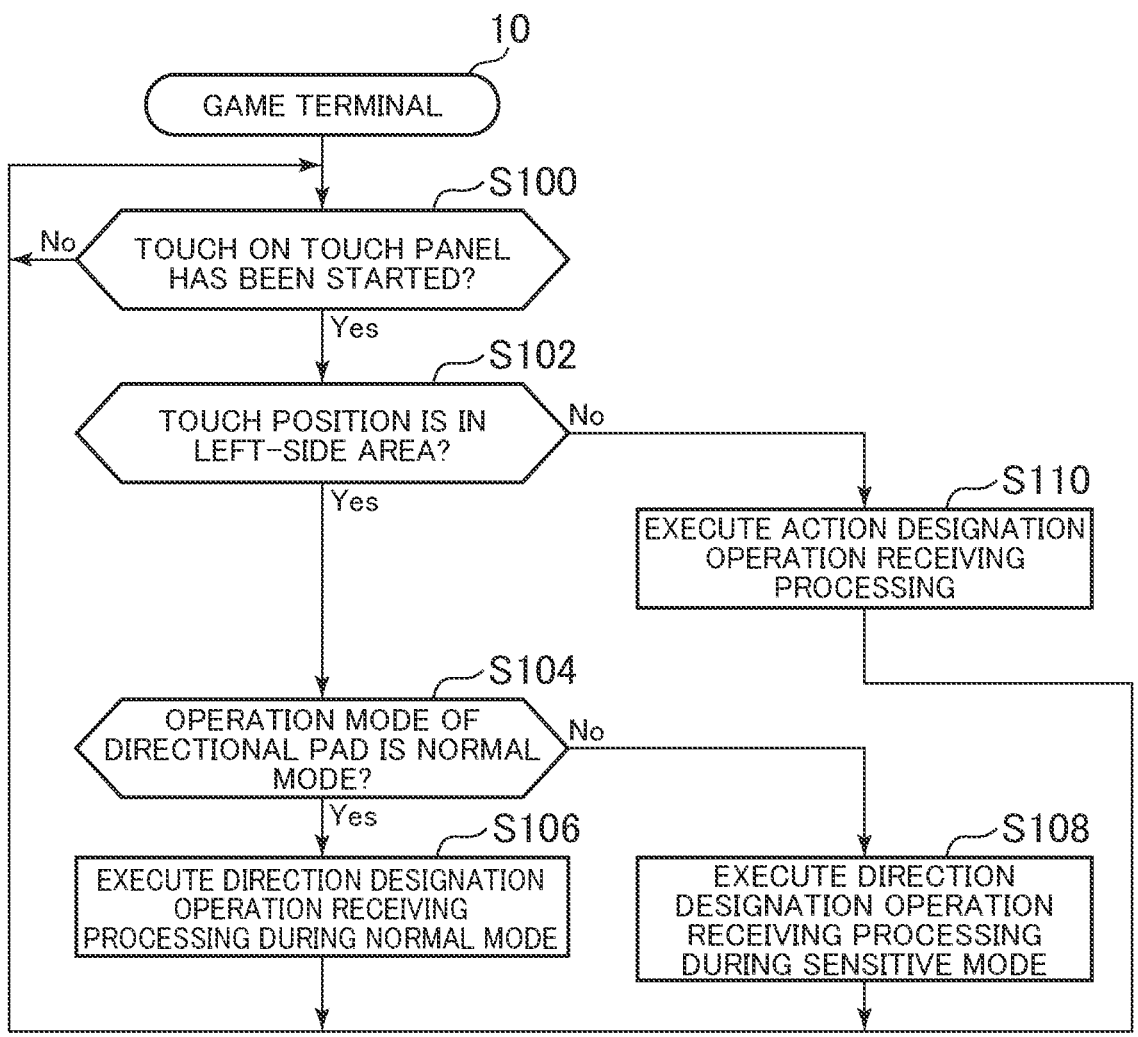
FIG. 16A is a flow chart for illustrating an outline of an example of processing to be executed in the game system.
Figure 16B:
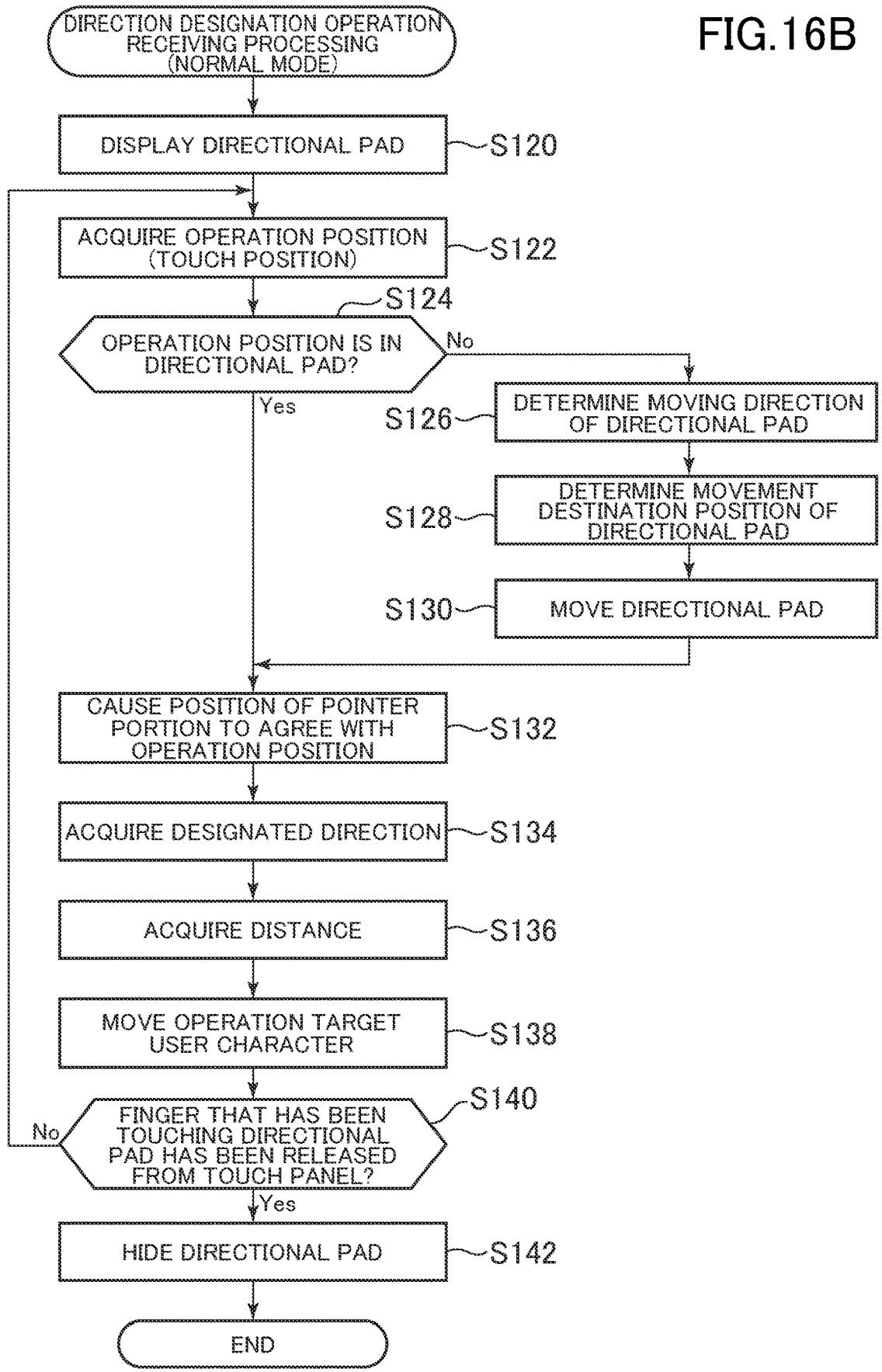
FIG. 16B is a flow chart for illustrating an outline of an example of direction designation operation receiving processing during the normal mode.
Figure 16C:
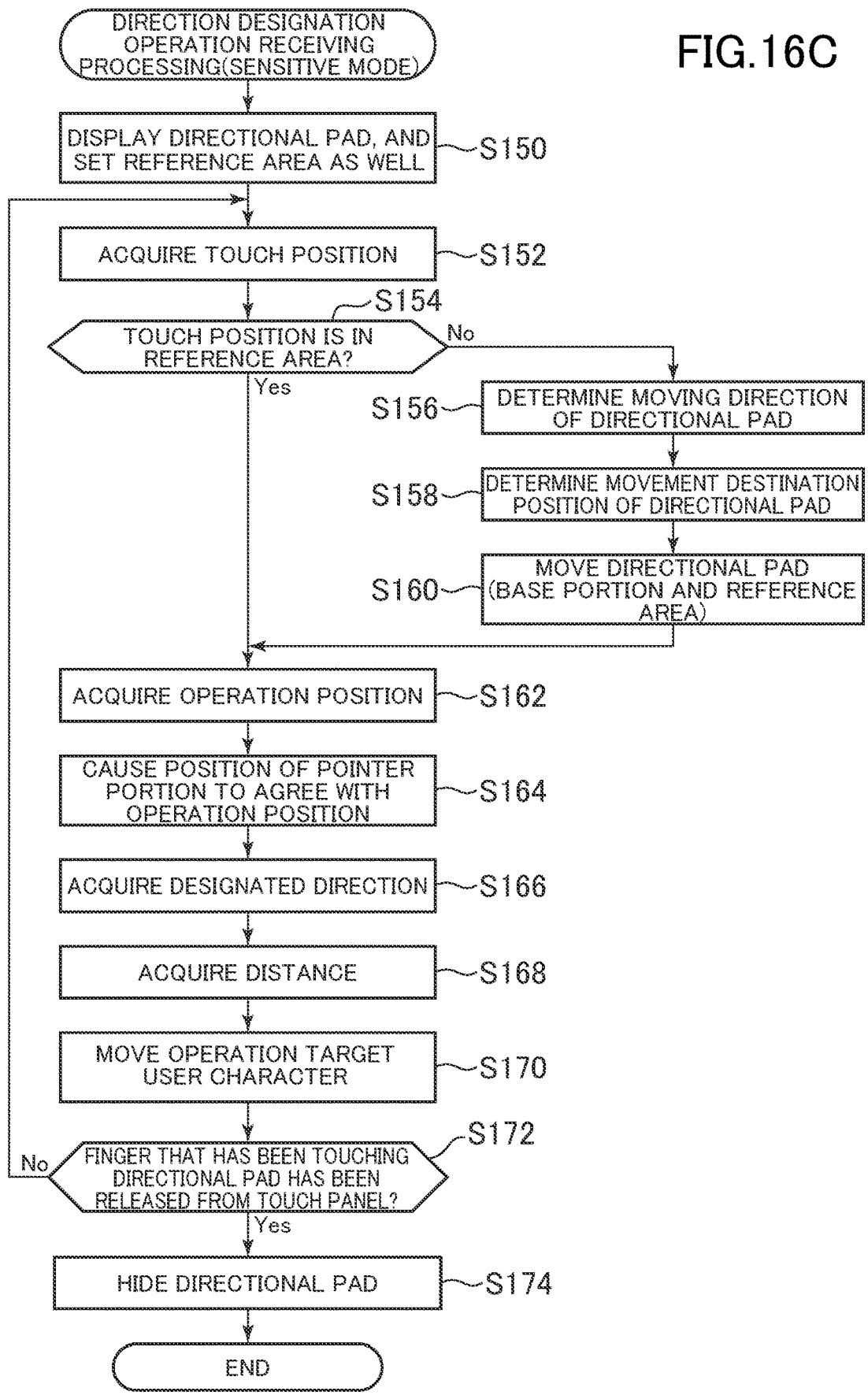
FIG. 16C is a flow chart for illustrating an outline of an example of direction designation operation receiving processing during the sensitive mode.

[4-1] FIG. 16A to FIG. 16C are flow charts for mainly illustrating an outline of processing for receiving an operation performed on the operation target user character UC among kinds of processing to be executed during the match in the soccer game. During the match in the soccer game, processing for controlling the user character UC or the opponent character OC other than the operation target, processing for updating the virtual world image G1 displayed on the display 15, and other such processing are executed, but are omitted in the following description. The controller 11 executes the processing illustrated in FIG. 16A to FIG. 16C in accordance with the program, to thereby function as the functional blocks illustrated in FIG. 15 (excluding the data storage 100).

[4-1-1] As illustrated in FIG. 16A, first, the controller 11 determines whether or not a touch on the touch panel TP has been started (Step S100). When a touch on the touch panel TP has not been started, the controller 11 continues to monitor whether or not a touch on the touch panel TP has been started (Step S100). Meanwhile, when a touch on the touch panel TP has been started, the controller 11 determines whether or not the touch position is in the left-side area LA (Step S102). For example, the controller 11 determines whether or not the $X_s$ coordinate of the touch position is smaller than $X_{max}/2$.

When the touch position is in the left-side area LA, the controller 11 determines whether or not the operation mode of the directional pad E10 selected by the user in advance is the normal mode (Step S104). When the operation mode of the directional pad E10 is the normal mode, the controller 11 executes direction designation operation receiving processing during the normal mode (Step S106). This processing is described later with reference to FIG. 16B.

Meanwhile, when the operation mode of the directional pad E10 is not the normal mode (namely, when the operation mode of the directional pad E10 is the sensitive mode), the controller 11 executes direction designation operation receiving processing during the sensitive mode (Step S108). This processing is described later with reference to FIG. 16C.

When determining in Step S102 that the touch position is not in the left-side area LA (namely, when the touch position is in the right-side area RA), the controller 11 executes action designation operation receiving processing (Step S110). That is, the controller 11 determines an operation performed in the right-side area RA by the user, and causes the operation target user character UC to perform an action associated with the determined operation.

For example, when the first button E18-1 in the right-side area RA is touched while the operation target user character UC is holding the ball B to be ready to perform a pass, the controller 11 causes the operation target user character UC to perform a pass. Meanwhile, for example, when a tap operation is performed on the second button E18-2 in the right-side area RA while the operation target user character UC is holding the ball B in the opponent's area to be ready to perform a shot, the controller 11 causes the operation target user character UC to perform a shot. For example, when a flick operation is performed in the right-side area RA while the operation target user character UC is holding the ball B, the controller 11 may cause the operation target user character UC to perform a pass in a direction corresponding to a flick direction. Meanwhile, for example, when a double-tap operation is performed in the right-side area RA while the operation target user character UC is holding the ball B in the opponent's area, the controller 11 may cause the operation target user character UC to perform a shot. In another case, for example, when a flick operation is performed in the right-side area RA while the opponent team is holding the ball B, the controller 11 may cause the operation target user character UC to perform a sliding tackle in a direction corresponding to a flick direction.

[4-1-2] FIG. 16B is a flow chart for illustrating an outline of an example of processing (direction designation operation receiving processing during the normal mode) to be executed in Step S106. As illustrated in FIG. 16B, first, the controller 11 displays the directional pad E10 in the left-side area LA (Step S120). At this time, the center points E12 and E14 of the base portion E11 and the pointer portion E13, respectively, are both set to the touch position.

While the directional pad E10 is being displayed, the controller 11 repeatedly executes the processing from Step S122 to Step S140. That is, the controller 11 acquires the touch position as the operation position (Step S122), and determines whether or not the operation position is in the directional pad E10 (base portion E11) (Step S124).

When the operation position is in the directional pad E10 (base portion E11), the controller 11 causes the position of the pointer portion E13 to agree with the operation position (Step S132). That is, the controller 11 updates the position of the pointer portion E13 so that the center point E14 becomes the operation position.

Meanwhile, when the operation position is not in the directional pad E10 (base portion E11) (namely, when the operation position is outside the directional pad E10 (base portion E11)), the controller 11 determines the moving direction of the directional pad E10 (Step S126). That is, the controller 11 determines, as the moving direction, a direction from the current position of the center point E12 of the directional pad E10 to the operation position acquired in Step S122. For example, in the example illustrated in FIG. 9A and FIG. 9B, the controller 11 determines, as the moving direction, the direction DC from the position PA (current position of the center point E12) to the position PC (operation position acquired in Step S122).

After the execution of Step S126, the controller 11 determines the movement destination position of the directional pad E10 (Step S128). First, the controller 11 acquires a distance between the current position of the center point E12 of the directional pad E10 and an operation position acquired last time before the operation position acquired in Step S122. For example, in the example illustrated in FIG. 9A and FIG. 9B, the controller 11 acquires the distance LX between the position PA (current position of the center point E12) and the position PB (operation position acquired last time before the operation position acquired in Step S122). Then, the controller 11 determines a position on a straight line extending from the current position of the center point E12 in the moving direction determined in Step S126, which is spaced apart from the operation position acquired in Step S122 by the above-mentioned distance, as the movement destination position. For example, in the example illustrated in FIG. 9A and FIG. 9B, the controller 11 determines the position PE on the straight line extending from the position PA (current position of the center point E12) in the direction DC (moving direction determined in Step S126), which is spaced apart from the position PC (operation position acquired in Step S122) by the distance LX, as the movement destination position.

After the execution of Step S128, the controller 11 moves the directional pad E10 (base portion E11) (Step S130). That is, the controller 11 moves the directional pad E10 (base portion E11) so that the center point E12 becomes the movement destination position determined in Step S128. Then, the controller 11 causes the position of the pointer portion E13 to agree with the operation position (Step S132).

After the execution of Step S132, the controller 11 acquires, as the designated direction, a direction from the center point E12 of the directional pad E10 to the operation position acquired in Step S122 (Step S134). The controller 11 further acquires a distance between the center point E12 of the directional pad E10 and the operation position acquired in Step S122 (Step S136).

After the execution of Step S134 and Step S136, the controller 11 moves the operation target user character UC based on the designated direction and the distance acquired in Step S134 and Step S136, respectively (Step S138). At this time, the controller 11 sets the moving direction of the operation target user character UC to the direction corresponding to the designated direction in the virtual world VW, which is acquired in Step S134. The controller 11 further sets the moving speed of the operation target user character UC to the speed corresponding to the distance acquired in Step S136.

After the execution of Step S138, the controller 11 determines whether or not the finger or other such body part that has been touching the directional pad E10 has been released from the touch panel (Step S140). When the finger or other such body part that has been touching the directional pad E10 has not been released from the touch panel, the controller 11 again executes the processing of Step S122. Meanwhile, when the finger or other such body part that has been touching the directional pad E10 has been released from the touch panel, the controller 11 hides the directional pad E10 (Step S142), and brings this processing to an end. That is, the processing of Step S106 is brought to an end.

[4-1-3] FIG. 16C is a flow chart for illustrating an outline of an example of processing (direction designation operation receiving processing during the sensitive mode) to be executed in Step S108. As illustrated in FIG. 16C, first, the controller 11 displays the directional pad E10 in the left-side area LA, and sets the reference area E15 as well (Step S150). At this time, the center point E12 of the directional pad E10 (base portion E11 and reference area E15) and the center point E14 of the pointer portion E13 are both set to the touch position.

While the directional pad E10 is being displayed, the controller 11 repeatedly executes the processing from Step S152 to Step S172. That is, the controller 11 acquires the touch position T (Step S152), and determines whether or not the touch position T is in the reference area E15 (Step S154).

When the touch position T is in the reference area E15, the controller 11 acquires the operation position (Step S162). First, the controller 11 acquires the distance L between the center point E12 of the directional pad E10 and the touch position T. Then, the controller 11 acquires, as the operation position, the position spaced apart from the center point E12 in the direction of the touch position T by a distance twice as long as the above-mentioned distance L. Then, the controller 11 causes the position of the pointer portion E13 to agree with the operation position (Step S164). That is, the controller 11 updates the position of the pointer portion E13 so that the pointer portion E13 becomes the operation position.

Meanwhile, when the touch position T is not in the reference area E15 (namely, the touch position T is outside the reference area E15), the controller 11 determines the moving direction of the directional pad E10 (Step S156). That is, the controller 11 determines, as the moving direction, the direction from the current position of the center point E12 in the reference area E15 to the touch position T acquired in Step S152. For example, in the case of the example illustrated in FIG. 13A and FIG. 13B, the controller 11 determines, as the moving direction, the direction DG from the position PF (current position of the center point E12) to the position PH (touch position T acquired in Step S152).

After the execution of Step S156, the controller 11 determines the movement destination position of the directional pad E10 (Step S158). First, the controller 11 acquires a distance between the current position of the center point E12 in the reference area E15 and the touch position T acquired last time before the touch position T acquired in Step S152. For example, in the case of the example illustrated in FIG. 13A and FIG. 13B, the controller 11 acquires the distance LY between the position PF (current position of the center point E12) and the position PG (touch position acquired last time before the touch position acquired in Step S152). Then, the controller 11 determines the position on a straight line extending from the current position of the center point E12 in the reference area E15 in the moving direction determined in Step S156, which is spaced apart from the touch position T acquired in Step S152 by the above-mentioned distance, as the movement destination position. For example, in the case of the example illustrated in FIG. 13A and FIG. 13B, the controller 11 determines the position PK on the straight line extending from the position PF (current position of the center point E12) in the direction DG (moving direction determined in Step S156), which is spaced apart from the position PH (touch position T acquired in Step S152) by the distance LY, as the movement destination position.

After the execution of Step S158, the controller 11 moves the directional pad E10 (base portion E11 and reference area E15) (Step S160). That is, the controller 11 moves the directional pad E10 (base portion E11 and reference area E15) so that the center point E12 becomes the movement destination position determined in Step S158. Then, the controller 11 acquires the operation position (Step S162), and causes the position of the pointer portion E13 to agree with the operation position (Step S164).

After the execution of Step S164, the controller 11 acquires, as the designated direction, a direction from the center point E12 of the directional pad E10 to the operation position acquired in Step S162 (Step S166). The controller 11 further acquires a distance between the center point E12 of the directional pad E10 and the operation position acquired in Step S162 (Step S168).

After the execution of Step S166 and Step S168, the controller 11 moves the operation target user character UC based on the designated direction and the distance acquired in Step S166 and Step S168, respectively (Step S170). The processing of Step S170 is the same as that of Step S138.

After the execution of Step S170, the controller 11 determines whether or not the finger or other such body part that has been touching the directional pad E10 has been released from the touch panel (Step S172). When the finger or other such body part that has been touching the directional pad E10 has not been released from the touch panel, the controller 11 again executes the processing of Step S152. Meanwhile, when the finger or other such body part that has been touching the directional pad E10 has been released from the touch panel, the controller 11 hides the directional pad E10 (Step S174), and brings this processing to an end. That is, the processing of Step S108 is brought to an end.

[4-2] FIG. 17A to FIG. 17E are flow charts for illustrating overall processing to be executed during the match in the soccer game.

Figure 17A:
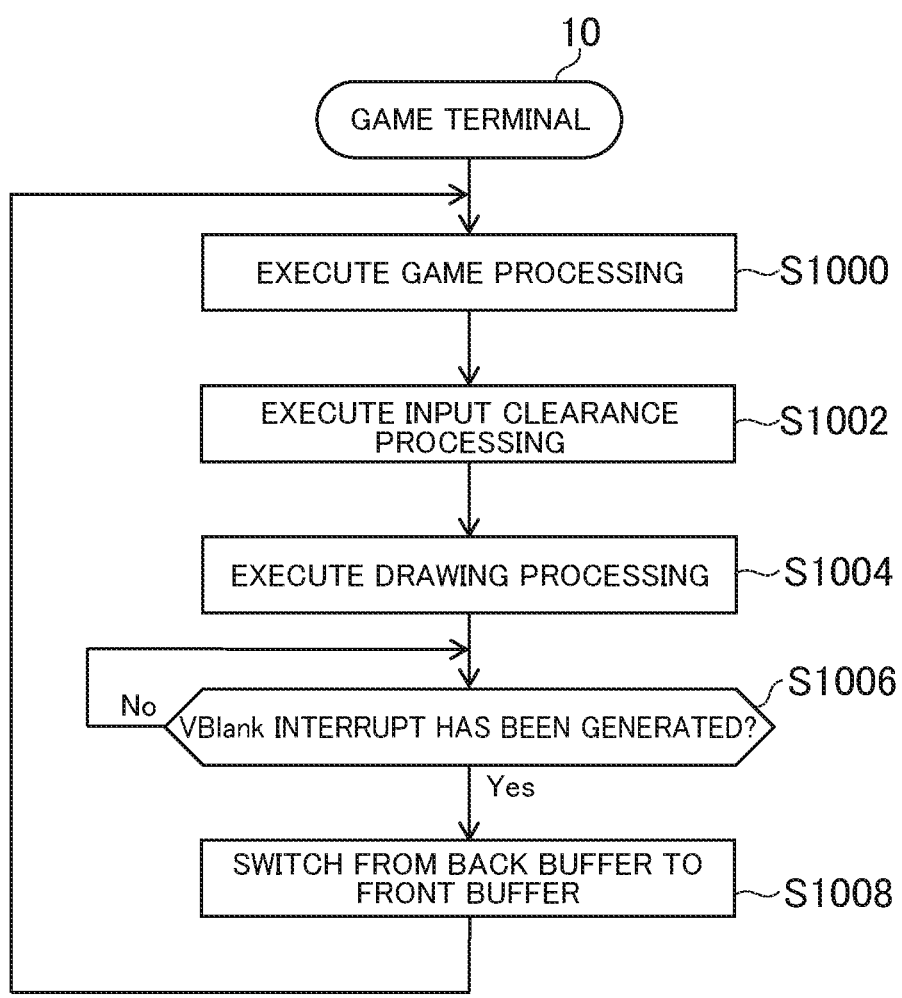
FIG. 17A is a flow chart for illustrating an example of overall processing to be executed on a game terminal during a match in a soccer game.

[4-2-1] FIG. 17A is a flowchart for illustrating processing to be executed in the game terminal 10 during the match in the soccer game. As illustrated in FIG. 17A, first, the controller 11 executes the game processing (Step S1000). For example, processing for updating the positions, moving directions, moving speeds, motions, and other such items of the user character UC and the opponent character OC and processing for updating the position, moving direction, moving speed, and other such items of the ball B are executed.

For example, in Step S1000, the same processing as the processing from Step S134 to Step S138 (during the normal mode) in FIG. 16B or the processing from Step S166 to Step S170 (during the sensitive mode) in FIG. 16C is executed as the processing for updating the position, moving direction, and moving speed of the operation target user character UC.

In Step S1000, processing corresponding to the first button E18-1 is also executed based on a first edge trigger flag or a second edge trigger flag of the first button E18-1. In addition, processing corresponding to the second button E18-2 is executed based on a first edge trigger flag or a second edge trigger flag of the second button E18-2.

In this case, the "first edge trigger flag" of the first button E18-1 refers to a flag indicating whether or not the state of the first button E18-1 is changed from the state of not being touched to the state of being touched. The first edge trigger flag is set to ON when the state of the first button E18-1 is changed from the state of not being touched to the state of being touched. When the match is started, the first edge trigger flag of the first button E18-1 is initialized to OFF.

Meanwhile, the "second edge trigger flag" of the first button E18-1 refers to a flag indicating whether or not the finger or other such body part that has been touching the first button E18-1 has been released from the touch panel TP. The second edge trigger flag is set to ON when the finger or other such body part that has been touching the first button E18-1 has been released from the touch panel TP. When the match is started, the second edge trigger flag of the first button E18-1 is initialized to OFF.

The "first edge trigger flag" and the "second edge trigger flag" of the second button E18-2 are the same as the first edge trigger flag and the second edge trigger flag of the first button E18-1, and descriptions thereof are omitted.

For example, in Step S1000, the first button E18-1 is a button for causing the operation target user character UC to perform a pass, and when the first edge trigger flag of the first button E18-1 is set to ON under a state in which the operation target user character UC is ready to perform a pass, processing for causing the operation target user character UC to start a passing motion, processing for causing the ball B to start to move in the passing direction, and other such processing are executed.

Meanwhile, for example, in Step S1000, the second button E18-2 is a button for causing the operation target user character UC to perform a shot, and when the second edge trigger flag of the second button E18-2 is set to ON under a state in which the operation target user character UC is ready to perform a shot, processing for causing the operation target user character UC to start a shooting motion, processing for causing the ball B to start to move in the shooting direction, and other such processing are executed. At this time, the strength (or angle) of the shooting is set based on a time period after the first edge trigger flag of the second button E18-2 is set to ON until the second edge trigger flag is set to ON (namely, time period taken after the user touches the second button E18-2 by the finger or other such body part until the finger or other such body part is released from the touch panel TP).

After the execution of Step S1000, the controller 11 executes input clearance processing (Step S1002). For example, the first edge trigger flag and the second edge trigger flag of each of the first button E18-1 and the second button E18-2 are reset to OFF.

The controller 11 further executes drawing processing (Step S1004). For example, the virtual viewpoint VC is set, and the virtual world image G1 indicating the virtual world VW viewed from the virtual viewpoint VC is drawn in a back buffer. In addition, the images of the first button E18-1 and the second button E18-2 are drawn on the virtual world image G1 drawn in the back buffer. When a directional pad drawing status, which is described later, is ON, an image of the directional pad E10 is also drawn on the virtual world image G1 drawn in the back buffer. The images of the directional pad E10, the first button E18-1, and the second button E18-2 may be translucently composited over the virtual world image G1.

Then, the controller 11 waits for a VBlank interrupt to be generated (Step S1006). When the VBlank interrupt is generated, the controller 11 switches from the back buffer to a front buffer (Step S1008). With this switching, the images drawn in the back buffer in Step S1004 are displayed on the display 15. After the execution of Step S1008, the procedure returns to Step S1000. In this manner, during the match in the soccer game, the processing from Step S1000 to Step S1008 described above is repeatedly executed.

Figure 17B:
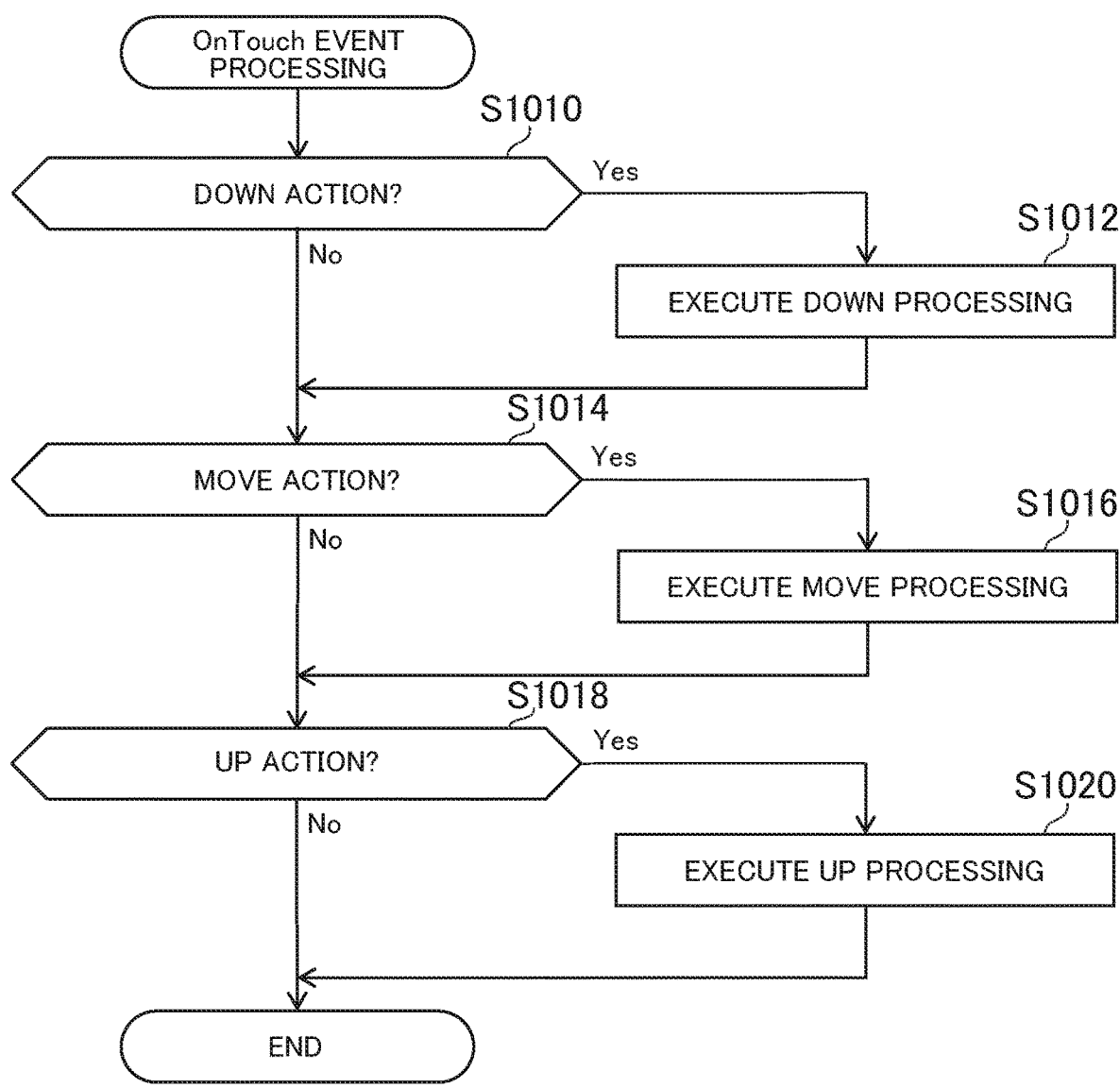
FIG. 17B is a flow chart for illustrating an example of OnTouch event processing.

[4-2-2] On the game terminal 10, an OnTouch event (interrupt) is generated every time each of actions of, for example, touching the touch panel TP (DOWN action), sliding the finger or other such body part touching the touch panel TP (MOVE action), and releasing the finger or other such body part that has been touching the touch panel TP from the touch panel TP (UP action) is performed. The generation of an OnTouch event and discrimination of the action relating to the OnTouch event are performed based on a result of detecting the touch on the operation device 14 (touch panel TP). FIG. 17B is a flowchart for illustrating processing to be executed when an OnTouch event is generated during the match in the soccer game.

As illustrated in FIG. 17B, when an OnTouch event is generated, the controller 11 determines whether or not the action relating to the OnTouch event is the DOWN action (Step S1010). A case in which "the action relating to the OnTouch event is the DOWN action" refers to a case in which the user has touched the touch panel TP. In this case, the controller 11 executes DOWN processing (Step S1012). The "DOWN processing" refers to processing to be executed in the case of the DOWN action. Details of the processing are described later with reference to FIG. 17C.

The controller 11 also determines whether or not the action relating to the OnTouch event is the MOVE action (Step S1014). A case in which "the action relating to the OnTouch event is the MOVE action" refers to a case in which the user has slid the finger or other such body part touching the touch panel TP. In this case, the controller 11 executes MOVE processing (Step S1016). The "MOVE processing" refers to processing to be executed in the case of the MOVE action. Details of the processing are described later with reference to FIG. 17D.

The controller 11 also determines whether or not the action relating to the OnTouch event is the UP action (Step S1018). A case in which "the action relating to the OnTouch event is the UP action" refers to a case in which the user has released from the touch panel TP the finger or other such body part that has been touching the touch panel TP. In this case, the controller 11 executes UP processing (Step S1020). The "UP processing" refers to processing to be executed in the case of the UP action. Details of the processing are described later with reference to FIG. 17E.

Figure 17C:
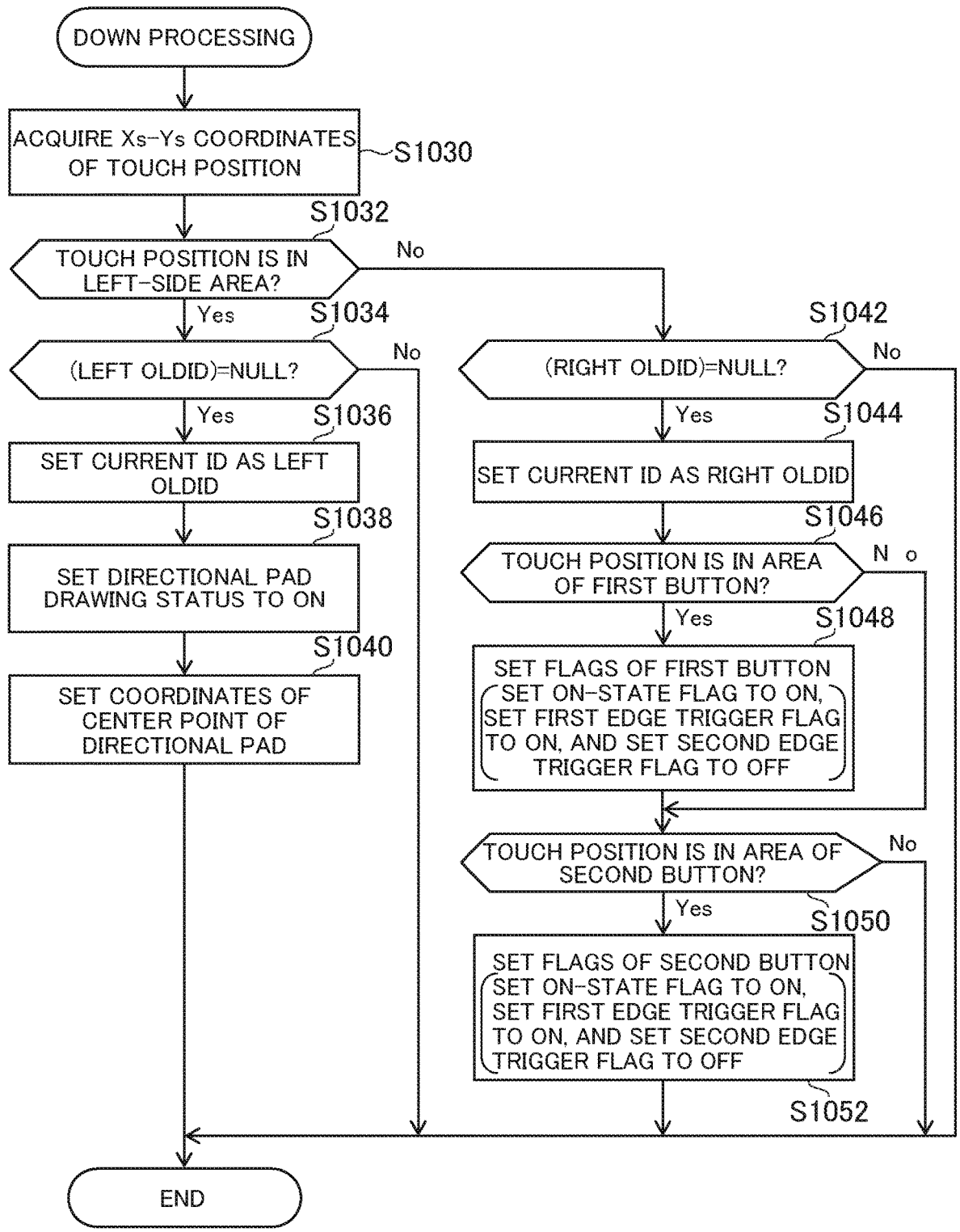
FIG. 17C is a flow chart for illustrating an example of DOWN processing.

[4-2-3] FIG. 17C is a flow chart for illustrating an example of the DOWN processing to be executed in Step S1012. As illustrated in FIG. 17C, the controller 11 acquires $X_s$-$Y_s$ coordinates of the touch position of the user (Step S1030). Then, the controller 11 determines whether or not the $X_s$-$Y_s$ coordinates of the touch position are in the left-side area LA (Step S1032). When the $X_s$-$Y_s$ coordinates of the touch position are in the left-side area LA, the controller 11 determines whether or not a left OLDID is NULL (Step S1034). The $X_s$-$Y_s$ coordinates of the touch position are acquired from the result of detecting the touch on the operation device 14 (touch panel TP).

On the game terminal 10, each time the touch panel TP is touched, an ID is assigned to the touch, and the position of the touch is managed in association with the ID. The association between the touch and the ID is maintained even when the position of the touch is moved, and the ID is associated with the OnTouch event generated in relation to the touch. In FIG. 17C, the "current ID" refers to the ID associated with the generated OnTouch event. In addition, the "left OLDID" is used for holding the ID of a touch having the touch start position in the left-side area LA. A state in which the left OLDID is not NULL and an ID is set as the left OLDID corresponds to a state in which the touch having the touch start position in the left-side area LA is maintained. Meanwhile, a state in which the left OLDID is NULL corresponds to a state in which the touch having the touch start position in the left-side area LA is not maintained.

A case in which "the controller 11 determines in Step S1034 that the left OLDID is not NULL" refers to a case in which, while the touch having the touch start position in the left-side area LA is maintained, another new touch having the touch start position in the left-side area LA has been performed with the ID of the new touch being set as the current ID. In at least one embodiment, such a new touch is ignored to bring this processing to an end.

Meanwhile, when determining in Step S1034 that the left OLDID is NULL, the controller 11 sets the current ID as the left OLDID (Step S1036). Then, the controller 11 sets the directional pad drawing status to ON (Step S1038), and sets the coordinates acquired in Step S1030 as the coordinates of the center point E12 of the directional pad E10 (Step S1040). The directional pad drawing status indicates whether or not to draw the directional pad E10 in Step S1004. When the match is started, the directional pad drawing status is set to OFF, and when the directional pad drawing status is OFF, the directional pad E10 is not drawn in Step S1004. Meanwhile, when the directional pad drawing status is ON, the directional pad E10 is drawn in Step S1004. At this time, the directional pad E10 is drawn so as to have the coordinates set in Step S1040 as the center point E12.

When determining in Step S1032 that the $X_s$-$Y_s$ coordinates of the touch position are not in the left-side area LA, the controller 11 determines whether or not a right OLDID is NULL (Step S1042). In this case, similarly in the "left OLDID", the "right OLDID" is used for holding the ID of a touch having the touch start position in the right-side area RA. A state in which the right OLDID is not NULL and an ID is set as the right OLDID corresponds to a state in which the touch having the touch start position in the right-side area RA is maintained. Meanwhile, a state in which the right OLDID is NULL corresponds to a state in which the touch having the touch start position in the right-side area RA is not maintained.

A case in which "the controller 11 determines in Step S1042 that the right OLDID is not NULL" refers to a case in which, while the touch having the touch start position in the right-side area RA is maintained, another new touch having the touch start position in the right-side area RA has been performed with the ID of the new touch being set as the current ID. In at least one embodiment, such a new touch is ignored to bring this DOWN processing to an end.

Meanwhile, when determining in Step S1042 that the right OLDID is NULL, the controller 11 sets the current ID as the right OLDID (Step S1044). Then, the controller 11 determines whether or not the $X_s$-$Y_s$ coordinates of the touch position acquired in Step S1030 are in the area of the first button E18-1 (Step S1046). In this case, the "area of the first button E18-1" may refer to an area in which the first button E18-1 is displayed, or may refer to a separate invisible (hidden) area set for the first button E18-1.

When the $X_s$-$Y_s$ coordinates of the touch position are in the area of the first button E18-1, the controller 11 sets the flags of the first button E18-1 (Step S1048).

For example, the controller 11 sets an ON-state flag of the first button E18-1 to ON, sets the first edge trigger flag to ON, and sets the second edge trigger flag to OFF. The "ON-state flag" of the first button E18-1 refers to a flag indicating whether or not the first button E18-1 is being touched. The ON-state flag is set to OFF when the first button E18-1 is not being touched, and is set to ON when the first button E18-1 is being touched. When the match is started, the ON-state flag of the first button E18-1 is initialized to OFF.

When determining in Step S1046 that the $X_s$-$Y_s$ coordinates of the touch position are not in the area of the first button E18-1, the controller 11 executes Step S1050, which is described later, without executing Step S1048.

The controller 11 further determines whether or not the $X_s$-$Y_s$ coordinates of the touch position acquired in Step S1030 are in the area of the second button E18-2 (Step S1050). In this case, the "area of the second button E18-2" is similar to the area of the first button E18-1, and the processing of Step S1050 is also similar to the processing of Step S1046.

When the $X_s$-$Y_s$ coordinates of the touch position are in the area of the second button E18-2, the controller 11 sets the flags of the second button E18-2 (Step S1052). For example, the controller 11 sets an ON-state flag of the second button E18-2 to ON, sets the first edge trigger flag to ON, and sets the second edge trigger flag to OFF. The ON-state flag of the second button E18-2 is similar to the ON-state flag of the first button E18-1, and hence a description thereof is omitted below.

When determining in Step S1050 that the $X_s$-$Y_s$ coordinates of the touch position are not in the area of the second button E18-2, the controller 11 brings this processing to an end without executing Step S1050.

Figure 17D:
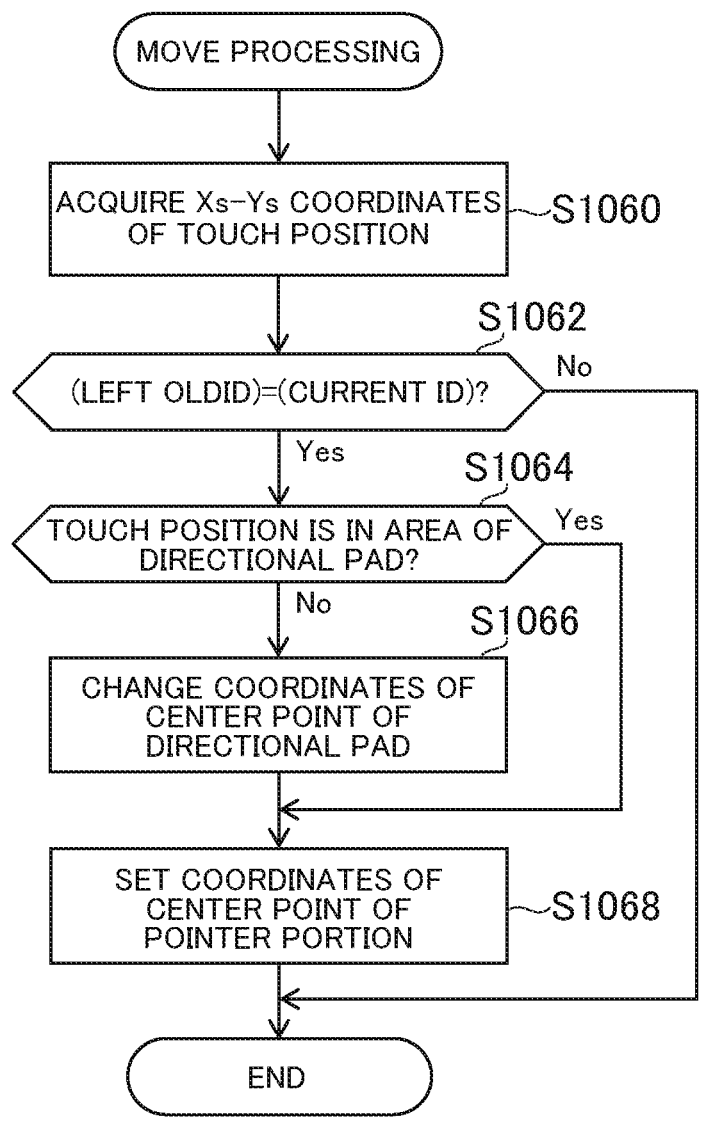
FIG. 17D is a flow chart for illustrating an example of MOVE processing.

[4-2-4] FIG. 17D is a flow chart for illustrating an example of the MOVE processing to be executed in Step S1016. As illustrated in FIG. 17D, first, the controller 11 acquires the $X_s$-$Y_s$ coordinates of the touch position relating to the generated OnTouch event (MOVE action) (Step S1060). Then, the controller 11 determines whether or not the left OLDID is the current ID (Step S1062). The $X_s$-$Y_s$ coordinates of the touch position are acquired from the result of detecting the touch on the operation device 14 (touch panel TP). In this case, the "current ID" refers to an ID associated with the generated OnTouch event, and is the ID of the touch relating to the MOVE action.

A case in which "the left OLDID is the current ID" refers to a case in which the generated OnTouch event (MOVE action) relates to the movement of the finger or other such body part touching the directional pad E10. In this case, the controller 11 determines whether or not the $X_s$-$Y_s$ coordinates of the touch position acquired in Step S1060 are in the area of the directional pad E10 (Step S1064). During the normal mode, the controller 11 determines whether or not the $X_s$-$Y_s$ coordinates of the touch position are in the display area of the directional pad E10 (base portion E11). Meanwhile, during the sensitive mode, the controller 11 determines whether or not the $X_s$-$Y_s$ coordinates of the touch position are in the reference area E15.

When the $X_s$-$Y_s$ coordinates of the touch position are not in the area of the directional pad E10, the controller 11 changes the coordinates of the center point E12 of the directional pad E10 (Step S1066). The processing of Step S1066 is the same as the processing from Step S126 to Step S130 (during the normal mode) in FIG. 16B or the processing from Step S156 to Step S160 (during the sensitive mode) in FIG. 16C, and hence a description thereof is omitted below.

The controller 11 also sets the coordinates of the center point E14 of the pointer portion E13 based on the coordinate acquired in Step S1060 (Step S1068). The processing of Step S1068 is the same as the processing in Step S122 and Step S132 (during the normal mode) in FIG. 16B or the processing in Step S162 and Step S164 (during the sensitive mode) in FIG. 16C, and hence a description thereof is omitted below.

When determining in Step S1064 that the $X_s$-$Y_s$ coordinates of the touch position are in the area of the directional pad E10, the controller 11 executes Step S1068 without executing Step S1066. After the execution of Step S1068, the controller 11 brings this processing to an end. Meanwhile, when determining in Step S1062 that the left OLDID is not the current ID, the controller 11 brings this processing to an end without executing the processing from Step S1064 to Step S1068.

Figure 17E:
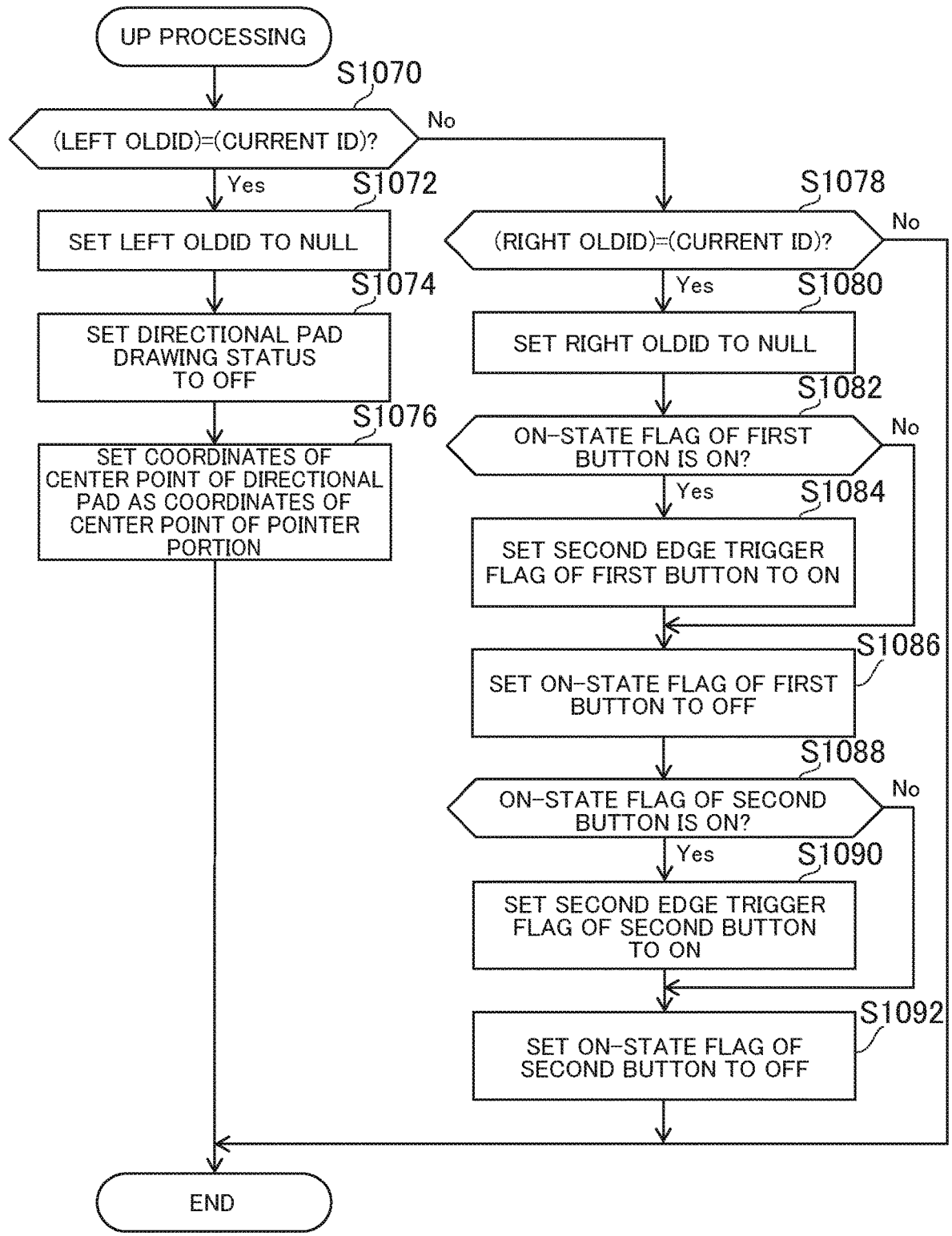
FIG. 17E is a flow chart for illustrating an example of UP processing.

[4-2-5] FIG. 17E is a flow chart for illustrating an example of UP processing to be executed in Step S1020. As illustrated in FIG. 17E, first, the controller 11 determines whether or not the left OLDID is the current ID (Step S1070). In this case, the "current ID" refers to an ID associated with the generated OnTouch event, which is the ID of the touch relating to the UP action. The "UP action" refers to releasing the finger or other such body part that has been touching the touch panel TP from the touch panel TP (namely, canceling the touch), and hence the "current ID" refers to the ID of the canceled touch.

A case in which "the controller 11 determines in Step S1070 that the left OLDID is the current ID refers to a case in which the finger or other such body part that has been touching the directional pad E10 has been released from the touch panel TP. In this case, the controller 11 sets the left OLDID to NULL (Step S1072), and sets the directional pad drawing status to OFF (Step S1074). Then, the controller 11 initializes the coordinates of the center point E14 of the pointer portion E13 to the coordinates of the center point E12 of the directional pad E10 (base portion E11) (Step S1076), and brings this processing to an end.

Meanwhile, when determining in Step S1070 that the left OLDID is not the current ID, the controller 11 determines whether or not the right OLDID is the current ID (Step S1078). A case in which "the controller 11 determines in Step S1078 that the right OLDID is the current ID" refers to a case in which the finger or other such body part that has been touching the touch panel TP in the right-side area RA has been released from the touch panel TP. In this case, the controller 11 sets the right OLDID to NULL (Step S1080). The controller 11 further determines whether or not the ON-state flag of the first button E18-1 is ON (Step S1082). Here, a case in which "the controller 11 determines in Step S1082 that the ON-state flag of the first button E18-1 is ON" refers to a case in which the finger or other such body part that has been touching the first button E18-1 has been released from the touch panel TP. In this case, the controller 11 sets the second edge trigger flag of the first button E18-1 to ON (Step S1084), and sets the ON-state flag of the first button E18-1 to OFF (Step S1086). When determining in Step S1082 that the ON-state flag of the first button E18-1 is not ON, the controller 11 executes Step S1086 without executing Step S1084.

Further, the controller 11 determines whether or not the ON-state flag of the second button E18-2 is ON (Step S1088). Here, a case in which "the controller 11 determines in Step S1088 that the ON-state flag of the second button E18-2 is ON" refers to a case in which the finger or other such body part that has been touching the second button E18-2 has been released from the touch panel TP. In this case, the controller 11 sets the second edge trigger flag of the second button E18-2 to ON (Step S1090), and sets the ON-state flag of the second button E18-2 to OFF (Step S1092). When determining in Step S1088 that the ON-state flag of the second button E18-2 is not ON, the controller 11 executes Step S1092 without executing Step S1090. After the execution of Step S1092, the controller 11 brings this processing to an end. When determining in Step S1078 that the right OLDID is not the current ID, the controller 11 also brings this processing to an end.

[5. Conclusion] In the game system 1 described above, the designated direction is acquired based on the direction from the center point E12 of the directional pad E10 to the operation position (center point E14 of pointer portion E13), and the game processing is executed based on the acquired designated direction.

In the game system 1, for example, as illustrated in FIG. 9A and FIG. 9B, as the operation position (touch position T) is moved from the position PB inside the directional pad E10 to the position PC outside the directional pad E10, the directional pad E10 is moved in the direction DC from the position PA, which is the center point E12 when the operation position is the position PB, to the position PC. Therefore, even when the user moves the operation position to the outside of the directional pad E10 unintentionally, the directional pad E10 is moved, and hence it is possible to avoid causing such an inconvenience that "although the user intends to have performed a direction designation operation, the game system determines that a direction designation operation has not been performed".

Particularly in the game system 1, as illustrated in FIG. 9B, the moving direction (direction DC) of the directional pad E10 reflects both the designated direction (direction DA) before the movement and the moving direction (direction DB) of the operation position. As described above, with the movement method illustrated in FIG. 9B, a deviation between the designated direction determined by the game system and the designated direction intended by the user can be reduced, and as a result, the operability can be improved.

In addition, in the game system 1, while the game processing is executed based on the distance between the center point E12 of the directional pad E10 and the operation position (center point E14 of pointer portion E13), with the movement method illustrated in FIG. 9B, the above-mentioned distance after the movement of the directional pad E10 (distance from the position PE to the position PC) becomes the same as the above-mentioned distance before the movement (distance from the position PA to the position PB), and hence the deviation between the above-mentioned distance determined by the game system after the movement of the directional pad E10 and the above-mentioned distance intended by the user can be reduced, and as a result, the operability can be improved.

Further, in the sensitive mode of the game system 1, in accordance with the movement of the touch position T, the operation position (center point E14 of the pointer portion E13) moves in the direction corresponding to the moving direction of the touch position T by the distance longer than the moving distance of the touch position T. Hitherto, in regard to the user who tends to have a short moving distance of the touch position, there has been a fear that the game system may inconveniently determine a direction other than the direction intended by the user has been designated. However, with the sensitive mode, such an inconvenience hardly occurs even for the user who tends to have a short moving distance of the touch position.

Further, in the sensitive mode of the game system 1, the reference area E15 equivalent to the area obtained by reducing the directional pad E10 to ½ is set, and the operation position (center point E14 of the pointer portion E13) is set so that the positional relationship between the operation position and the center point E12 of the directional pad E10 corresponds to the positional relationship between the touch position T and the center point E12 of the reference area E15. As a result, it suffices to set the moving distance of the operation position to the distance obtained by multiplying the moving distance of the touch position T by n, and hence it is possible to simplify such processing relating to the setting of the operation position as to move the operation position by the distance longer than the moving distance of the touch position T.

Further, in the game system 1, even in the sensitive mode, when the touch position T has been moved from the inside of the reference area E15 to the outside of the reference area E15, the directional pad E10 (base portion E11 and reference area E15) is moved in accordance with the movement of the touch position T as illustrated in FIG. 13A and FIG. 13B. Therefore, even when the user has moved the touch position T to the outside of the reference area E15 unintentionally, the user can continue the direction designation operation.

Further, in the game system 1, the user can freely select any one of the normal mode and the sensitive mode as the operation mode of the directional pad E10 as illustrated in FIG. 7. The user can select the operation mode of the directional pad E10 in consideration of the user's own tendency or habit.

Further, in the game system 1, when the touch panel TP is touched in the left-side area LA, the directional pad E10 is displayed in the left-side area LA, and the movement control processing for the user character UC is executed based on the direction designated through the directional pad E10. Meanwhile, when the touch panel TP is touched in the right-side area RA, the control processing other than the movement control processing for the user character UC is executed without displaying the directional pad E10. Therefore, according to the game system 1, the left-side area LA of the touch panel TP can be used for the movement designation operation for the user character UC, and the right-side area RA can be used for an operation other than the movement designation operation for the user character UC. That is, the area for performing the movement designation operation for the user character UC and the area for performing the operation other than the movement designation operation for the user character UC can be distinguished from each other, to thereby facilitate the user's operation.

Further, in the game system 1, as illustrated in FIG. 10, even when the user has moved the touch position T into the right-side area RA unintentionally after the directional pad E10 is displayed in the left-side area LA, the directional pad E10 is moved into the right-side area RA, and hence the user can continue the direction designation operation.

[6. Modification Example] The present invention is not limited to at least one embodiment described above.

Figure 18:
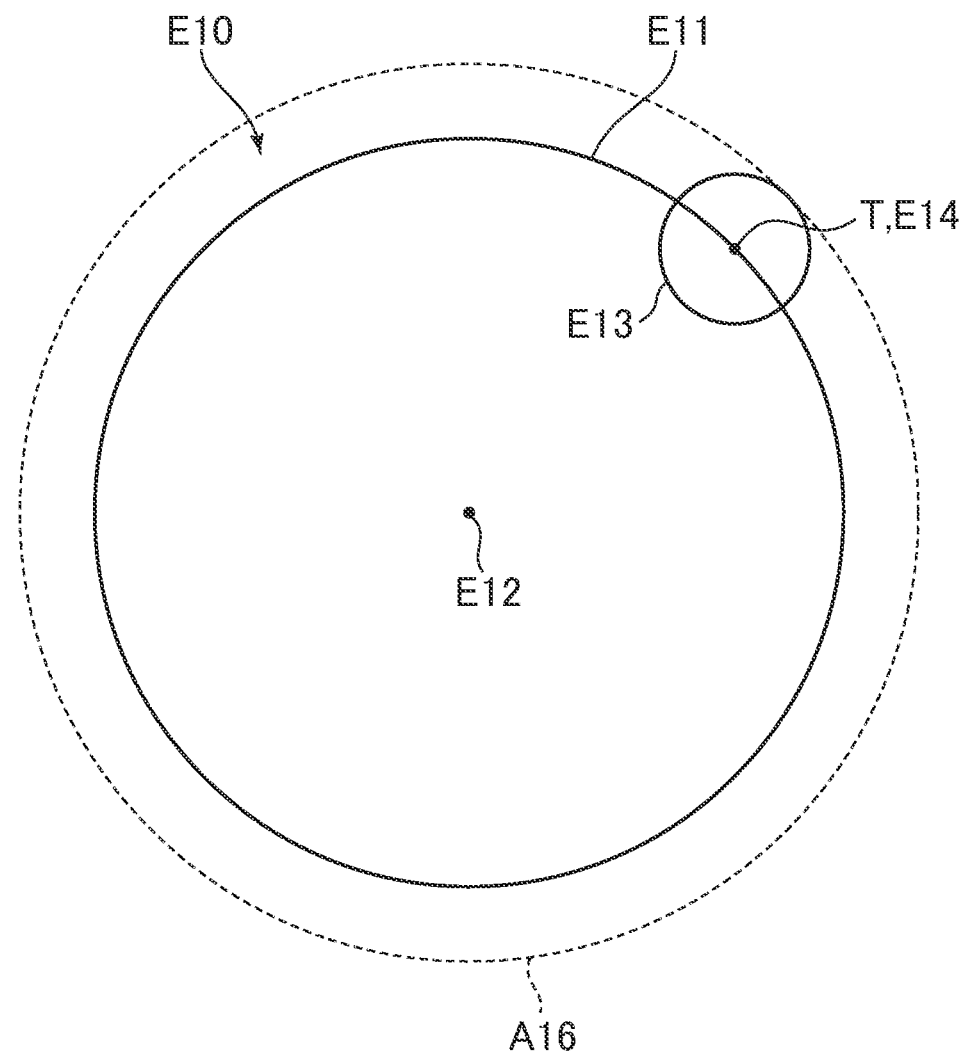
FIG. 18 is a diagram for illustrating a determination area.

[6-1] In at least one embodiment described above, it is determined whether or not the operation position is in the display area of the directional pad E10. However, for example, as illustrated in FIG. 18, an invisible (hidden) determination area A16 (one example of the reception area) may be set separately from the display area of the directional pad E10. For example, in Step S124 of FIG. 16B, it may be determined whether or not the operation position is in the determination area A16.

[6-2] In the case of the client-server game, the game terminal 10 may acquire the designated direction, for example, and transmit the acquired designated direction to the server 30, while the server 30 may execute the control processing on the user character UC. Then, the game terminal 10 may generate and update the virtual world image G1 based on a result of the control processing performed on the user character UC. In this case, the processing executor 150 is implemented by the server 30, and the game situation data D101 is also stored in the server 30. The acquisition of the designated direction and the generation of the virtual world image G1 may be executed by the server 30 as well. That is, all the functional blocks illustrated in FIG. 15 may be implemented by the server 30.

[6-3] Both of the normal mode and the sensitive mode may not be provided, and any one of the normal mode and the sensitive mode may be omitted. The functional blocks relating to the normal mode can be omitted when the normal mode is omitted, and the functional blocks relating to the sensitive mode can be omitted when the sensitive mode is omitted.

[6-4] The above description has been given mainly of the example of applying the present invention to the soccer game, but the present invention can also be applied to other various games. The above description has also been given of the example of applying the present invention to the game system 1 or the game terminal 10, which is an example of an information processing system or an information processing device, but the present invention can also be applied to an information processing system or an information processing device other than the game system 1 or the game terminal 10. In an information processing system or an information processing device provided with a touch panel, the directional pad E10 can also be used for moving the operation target, for example, a cursor.

7. Supplementary Notes

From the above description, the present invention is understood as follows, for example. In order to facilitate understanding of the present invention, the reference symbols provided in the drawings are enclosed in parentheses and assigned to components appropriately. However, the present invention is not to be limited to the modes illustrated in the drawings as a result of the assigned reference symbols.

(1) According to at least one aspect of the present invention, there is provided a game system (1) including: at least one processor; and at least one memory device configured to store a plurality of instructions, which, when executed by the at least one processor, cause the at least one processor to: set, on a touch panel (TP), a reception area (E10) for receiving a direction designation operation; move, in accordance with a movement of a touch position (T) on the touch panel (TP), an operation position (E14) in a direction corresponding to a moving direction of the touch position (T) by a distance longer than a moving distance of the touch position (T); acquire a designated direction based on a direction from a reference position (E12) corresponding to the reception area (E10) to the operation position (E14); and execute game processing based on the designated direction.

(9) According to at least one aspect of the present invention, there is provided a game control device (10 or 30) including: at least one processor; and at least one memory device configured to store a plurality of instructions, which, when executed by the at least one processor, cause the at least one processor to: set, on a touch panel (TP), a reception area (E10) for receiving a direction designation operation; move, in accordance with a movement of a touch position (T) on the touch panel (TP), an operation position (E14) in a direction corresponding to a moving direction of the touch position (T) by a distance longer than a moving distance of the touch position (T); and acquire a designated direction based on a direction from a reference position (E12) corresponding to the reception area (E10) to the operation position (E14).

(10) A program according to at least one aspect of the present invention is a program for causing a computer to function as the game system (1) of any one of the items (1) to (8) or as the game control device (10 or 30) of the item (9).

(11) An information storage medium according to at least one aspect of the present invention is a non-transitory computer-readable information storage medium having stored thereon the program of the item (10).

(12) A control method for a game system (1) or a game control device (10 or 30) according to at least one aspect of the present invention includes: an area setting step (Step S150) of setting, on a touch panel (TP), a reception area (E10) for receiving a direction designation operation; an operation position setting step (Step S162) of moving, in accordance with a movement of a touch position (T) on the touch panel (TP), an operation position (E14) in a direction corresponding to a moving direction of the touch position (T) by a distance longer than a moving distance of the touch position (T); and a designated direction acquisition step (Step S166) of acquiring a designated direction based on a direction from a reference position (E12) corresponding to the reception area (E10) to the operation position (E14).

According to at least one aspect of the invention of each of the items (1) and (9) to (12), the designated direction is acquired based on the direction from the reference position corresponding to the reception area to the operation position corresponding to the touch position, and the game processing is executed based on the acquired designated direction. In such a game, the moving distance of the actual touch position of the user tends to become shorter than the moving distance of the touch position required for designating the direction. Therefore, hitherto, there may occur such an inconvenience that, although the user intends to have moved the touch position so as to move the operation position to an area corresponding to a desired direction, the operation position has not reached the area corresponding to the desired direction in an actual case, to thereby cause the game system to determine that a direction other than the desired direction has been designated. However, according to at least one aspect of the present invention, the operation position is moved in the direction corresponding to the moving direction of the touch position by a distance longer than the moving distance of the touch position in accordance with the movement of the touch position. Therefore, such an inconvenience as described above hardly occurs.

(2) According to at least one aspect of the present invention, the plurality of instructions may further cause the at least one processor to: set a corresponding area (E15), which is smaller than the reception area (E10); set the operation position (E14) so that a positional relationship between the operation position (E14) and the reference position (E12) corresponding to the reception area (E10) corresponds to a positional relationship between the touch position (T) and a reference position (E12) corresponding to the corresponding area (E15); and move, in accordance with the movement of the touch position (T), the operation position (E14) in a direction corresponding to the moving direction of the touch position (T) by a distance obtained by increasing the moving distance of the touch position (T) based on a relative size of the reception area (E10) with respect to the corresponding area (E15).

According to at least one aspect of the invention of the item (2), it suffices to set the operation position so that the positional relationship between the operation position and the reference position corresponding to the reception area corresponds to the positional relationship between the touch position and the reference position corresponding to the corresponding area, and to set the moving distance of the operation position so as to increase the moving distance of the touch position based on the relative size of the reception area with respect to the corresponding area. Therefore, it is possible to simplify such processing relating to the setting of the operation position as to move the operation position by the distance longer than the moving distance of the touch position.

(3) According to at least one aspect of the present invention, the corresponding area (E15) may be an area equivalent to an area obtained by reducing the reception area (E10) to 1/n (where n represents a positive numerical value larger than 1), and the plurality of instructions may further cause the at least one processor to move, in accordance with the movement of the touch position (T), the operation position (E14) in the direction corresponding to the moving direction of the touch position (T) by a distance obtained by multiplying the moving distance of the touch position (T) by n.

According to at least one aspect of the invention of the item (3), it suffices to set the moving distance of the operation position to the distance obtained by multiplying the moving distance of the touch position by n. Therefore, it is possible to simplify such processing relating to the setting of the operation position as to move the operation position by the distance longer than the moving distance of the touch position.

(4) According to at least one aspect of the present invention, the plurality of instructions may further cause the at least one processor to move the corresponding area (E15) and the reception area (E10) as the touch position (T) is moved from an inside of the corresponding area (E15) to an outside of the corresponding area (E15).

According to at least one aspect of the invention of the item (4), even when the user has moved the touch position from the inside of the corresponding area to the outside of the corresponding area unintentionally, the corresponding area and the reception area are moved in accordance with the movement of the touch position, and hence the user can continue the direction designation operation.

(5) According to at least one aspect of the present invention, the plurality of instructions may further cause the at least one processor to set, when the touch panel (TP) is touched in a first area (LA) of the touch panel (TP), the reception area (E10) and the corresponding area (E15) in the first area (LA) based on the touch position (T), and avoid setting the reception area (E10) and the corresponding area (E15) when the touch panel (TP) is touched in a second area (RA) of the touch panel (TP), which is different from the first area (LA).

According to at least one aspect of the invention of the item (5), the reception area is set in the first area based on the touched position when the touch panel is touched in the first area, while the reception area is not set when the touch panel is touched in the second area, which is different from the first area. Therefore, the first area of the touch panel can be used for the direction designation operation, and the second area of the touch panel can be used for an operation other than the direction designation operation. That is, the area for performing the direction designation operation and the area for performing the operation other than the direction designation operation can be distinguished from each other, and as a result, the user can easily perform the operation.

(6) According to at least one aspect of the present invention, the plurality of instructions may further cause the at least one processor to move the reception area (E10) and the corresponding area (E15) into the second area (RA) as the touch position (T) is moved into the second area (RA) after the reception area (E10) and the corresponding area (E15) are set.

According to at least one aspect of the invention of the item (6), even when the user has moved the operation position into the second area unintentionally after the reception area and the corresponding area are set, the reception area and the corresponding area are moved into the second area, and hence the user can continue the direction designation operation.

(7) According to at least one aspect of the present invention, the plurality of instructions may further cause the at least one processor to: execute movement control processing for an operation target (UC) of a user based on the designated direction; and execute, when the touch panel is touched in the second area (RA), control processing relating to the operation target (UC) other than the movement control processing, based on one of the touch position and a movement locus of the touch position.

According to at least one aspect of the invention of the item (7), the movement control processing for the operation target is executed based on the designated direction, and when the touch panel is touched in the second area, the control processing relating to the operation target other than the movement control processing is executed based on the touch position or the movement locus of the touch position. Therefore, the first area of the touch panel can be used for the moving operation for the operation target, and the second area of the touch panel can be used for the operation other than the moving operation for the operation target.

(8) According to at least one aspect of the present invention, the plurality of instructions may further cause the at least one processor to receive a selection indicating by which one of the moving distance of the touch position (T) and the distance longer than the moving distance of the touch position (T) the operation position (E14) is to be moved in the direction corresponding to the moving direction of the touch position (T) in accordance with the movement of the touch position (T).

According to at least one aspect of the invention of the item (8), as a mode of moving the operation position, the user can freely select any one of the "mode of moving the operation position in the direction corresponding to the moving direction of the touch position by the distance longer than the moving distance of the touch position" and the "mode of moving the operation position in the direction corresponding to the moving direction of the touch position by the moving distance of the touch position".

(13) Further, according to at least one aspect of the present invention, there is provided an information processing system (1) including: at least one processor; and at least one memory device configured to store a plurality of instructions, which, when executed by the at least one processor, cause the at least one processor to: set, on a touch panel (TP), a reception area (E10) for receiving a direction designation operation; move, in accordance with a movement of a touch position (T) on the touch panel (TP), an operation position (E14) in a direction corresponding to a moving direction of the touch position (T) by a distance longer than a moving distance of the touch position (T); acquire a designated direction based on a direction from a reference position (E12) corresponding to the reception area (E10) to the operation position (E14); and execute processing based on the designated direction.

(14) Further, according to at least one aspect of the present invention, there is provided an information processing device (10 or 30) including: at least one processor; and at least one memory device configured to store a plurality of instructions, which, when executed by the at least one processor, cause the at least one processor to: set, on a touch panel (TP), a reception area (E10) for receiving a direction designation operation; move, in accordance with a movement of a touch position (T) on the touch panel (TP), an operation position (E14) in a direction corresponding to a moving direction of the touch position (T) by a distance longer than a moving distance of the touch position (T); and acquire a designated direction based on a direction from a reference position (E12) corresponding to the reception area (E10) to the operation position (E14).

(15) A program according to at least one aspect of the present invention is a program for causing a computer to function as the information processing system (1) of the item (13) or as the information processing device (10 or 30) of the item (14).

(16) An information storage medium according to at least one aspect of the present invention is a non-transitory computer-readable information storage medium having stored thereon the program of the item (15).

(17) A control method for an information processing system (1) or an information processing device (10 or 30) according to at least one aspect of the present invention includes: an area setting step (Step S150) of setting, on a touch panel (TP), a reception area (E10) for receiving a direction designation operation; an operation position setting step (Step S162) of moving, in accordance with a movement of a touch position (T) on the touch panel (TP), an operation position (E14) in a direction corresponding to a moving direction of the touch position (T) by a distance longer than a moving distance of the touch position (T); and a designated direction acquisition step (Step S166) of acquiring a designated direction based on a direction from a reference position (E12) corresponding to the reception area (E10) to the operation position (E14).

According to at least one aspect of the invention of each of the items from (10) to (14), the designated direction is acquired based on the direction from the reference position corresponding to the reception area to the operation position corresponding to the touch position, and processing is executed based on the acquired designated direction. In such a case, the moving distance of the actual touch position of the user tends to become shorter than the moving distance of the touch position required for designating the direction. Therefore, hitherto, there may occur such an inconvenience that, although the user intends to have moved the touch position so as to move the operation position to an area corresponding to a desired direction, the operation position has not reached the area corresponding to the desired direction in an actual case, to thereby cause the system or the device to determine that a direction other than the desired direction has been designated. However, according to at least one aspect of the present invention, the operation position is moved in the direction corresponding to the moving direction of the touch position by a distance longer than the moving distance of the touch position in accordance with the movement of the touch position. Therefore, such an inconvenience as described above hardly occurs.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game system comprising:
at least one processor; and
at least one memory device configured to store a plurality of instructions, which, when executed by the at least one processor, cause the at least one processor to:
set, on a touch panel, a reception area including a reference position for receiving a direction designation operation;
acquire a touch position which is a position at which the touch panel is configured to be touched by a user;
set an operation position on the reference position, the operation position being set separately from the touch position;
move, in accordance with a movement of the touch position on the touch panel, the operation position from the reference position in a moving direction of the touch position by a distance longer than a moving distance of the touch position;
acquire a designated direction based on a direction from the reference position to the operation position; and
execute game processing based on the designated direction,
wherein each of the touch position and the operation position moves from the reference position, and when the touch position is moved, the touch position is located on a line between the reference position and the operation position.

2. The game system according to claim 1, wherein the plurality of instructions further cause the at least one processor to:
set a corresponding area, which is smaller than the reception area;
set the operation position so that a positional relationship between the operation position and the reference position corresponding to the reception area corresponds to a positional relationship between the touch position and a reference position corresponding to the corresponding area; and
move, in accordance with the movement of the touch position, the operation position in a direction corresponding to the moving direction of the touch position by a distance obtained by increasing the moving distance of the touch position based on a relative size of the reception area with respect to the corresponding area.

3. The game system according to claim 2,
wherein the corresponding area includes an area equivalent to an area obtained by reducing the reception area to 1/n (where n represents a positive numerical value larger than 1), and
wherein the plurality of instructions further cause the at least one processor to move, in accordance with the movement of the touch position, the operation position in the direction corresponding to the moving direction of the touch position by a distance obtained by multiplying the moving distance of the touch position by n.

4. The game system according to claim 2, wherein the plurality of instructions further cause the at least one processor to move the corresponding area and the reception area as the touch position is moved from an inside of the corresponding area to an outside of the corresponding area.

5. The game system according to claim 2, wherein the plurality of instructions further cause the at least one processor to set, when the touch panel is touched in a first area of the touch panel, the reception area and the corresponding area in the first area based on the touch position, and avoid setting the reception area and the corresponding area when the touch panel is touched in a second area of the touch panel, which is different from the first area.

6. The game system according to claim 4, wherein the plurality of instructions further cause the at least one processor to:
set, when the touch panel is touched in a first area of the touch panel, the reception area and the corresponding area in the first area based on the touch position, and avoid setting the reception area and the corresponding area when the touch panel is touched in a second area of the touch panel, which is different from the first area; and
move the reception area and the corresponding area into the second area as the touch position is moved into the second area after the reception area and the corresponding area are set.

7. The game system according to claim 5, wherein the plurality of instructions further cause the at least one processor to:
execute movement control processing for an operation target of a user based on the designated direction; and
execute, when the touch panel is touched in the second area, control processing relating to the operation target other than the movement control processing, based on one of the touch position and a movement locus of the touch position.

8. The game system according to claim 1, wherein the plurality of instructions further cause the at least one processor to receive a selection indicating by which one of the moving distance of the touch position and the distance longer than the moving distance of the touch position the operation position is to be moved in accordance with the movement of the touch position.

9. A game control device comprising:
at least one processor; and
at least one memory device configured to store a plurality of instructions, which, when executed by the at least one processor, cause the at least one processor to:
set, on a touch panel, a reception area including a reference position for receiving a direction designation operation;
acquire a touch position which is a position at which the touch panel is configured to be touched by a user;
set an operation position on the reference position, the operation position being set separately from the touch position;
move, in accordance with a movement of the touch position on the touch panel, the operation position from the reference position in a moving direction of the touch position by a distance longer than a moving distance of the touch position; and
acquire a designated direction based on a direction from the reference position to the operation position,
wherein each of the touch position and the operation position moves from the reference position, and
when the touch position is moved, the touch position is located on a line between the reference position and the operation position.

10. A non-transitory information storage medium having stored thereon a program for causing a computer to:
set, on a touch panel, a reception area including a reference position for receiving a direction designation operation;
acquire a touch position which is a position at which the touch panel is configured to be touched by a user;
set an operation position on the reference position, the operation position being set separately from the touch position;
move, in accordance with a movement of the touch position on the touch panel, the operation position from the reference position in a moving direction of the touch position by a distance longer than a moving distance of the touch position; and
acquire a designated direction based on a direction from the reference position to the operation position,
wherein each of the touch position and the operation position moves from the reference position, and
when the touch position is moved, the touch position is located on a line between the reference position and the operation position.

* * * * *